(12) United States Patent
Cao

(10) Patent No.: US 12,477,069 B2
(45) Date of Patent: Nov. 18, 2025

(54) AUDIO DATA PROCESSING METHOD AND APPARATUS, DEVICE, AND STORAGE MEDIUM

(71) Applicant: TENCENT TECHNOLOGY (SHENZHEN) COMPANY LTD, Guangdong (CN)

(72) Inventor: Muyong Cao, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 299 days.

(21) Appl. No.: 17/991,239

(22) Filed: Nov. 21, 2022

(65) Prior Publication Data
US 2023/0146871 A1      May 11, 2023

Related U.S. Application Data

(63) Continuation of application No. PCT/CN2021/131404, filed on Nov. 18, 2021.

(30) Foreign Application Priority Data

Jan. 22, 2021    (CN) .......................... 202110088769.3

(51) Int. Cl.
*H04M 9/08*       (2006.01)
*G06F 9/445*      (2018.01)
*H03G 3/20*       (2006.01)

(52) U.S. Cl.
CPC ........ *H04M 9/082* (2013.01); *G06F 9/44505* (2013.01); *H03G 3/20* (2013.01)

(58) Field of Classification Search
CPC ....... G06F 16/683; G06F 16/68; G06F 16/635
(Continued)

(56) References Cited

U.S. PATENT DOCUMENTS

2009/0204922 A1    8/2009   Bhattacharjee et al.
2009/0253506 A1*  10/2009   Ishii ........................ A63F 13/48
                                                               463/31
(Continued)

FOREIGN PATENT DOCUMENTS

CN        107966910 A      4/2018
CN        108762926 A     11/2018
(Continued)

OTHER PUBLICATIONS

International Search Report for PCT/CN2021/131404 dated, Feb. 15, 2022 (PCT/ISA/210).
(Continued)

*Primary Examiner* — Alexander Krzystan
(74) *Attorney, Agent, or Firm* — Sughrue Mion, PLLC

(57) ABSTRACT

An audio data processing method and apparatus, a device, and a storage medium that can obtain, in a game voice mode, a signal processing result associated with a first pre-signal processing policy in an application layer of a service application; control, in the application layer according to the signal processing result, a turned-on/turned-off state of a second optimization component in a second pre-signal processing policy in a terminal system layer, or a turned-on/turned-off state of a first optimization component in the first pre-signal processing policy, a first optimization component turned on in the first pre-signal processing policy being different from a second optimization component turned on in the second pre-signal processing policy; and obtain uplink voice data of a first user in the game voice mode, and perform voice optimization on the uplink voice data based on the turned-on first optimization component and the turned-on second optimization component.

20 Claims, 15 Drawing Sheets

(58) Field of Classification Search
USPC .......................................................... 700/94
See application file for complete search history.

(56) References Cited

U.S. PATENT DOCUMENTS

| | | | | |
|---|---|---|---|---|
| 2009/0268931 | A1* | 10/2009 | Andrea | H04R 3/005 |
| | | | | 381/94.1 |
| 2010/0098266 | A1* | 4/2010 | Mukund | G10L 21/0208 |
| | | | | 381/94.7 |
| 2016/0284358 | A1 | 9/2016 | Liu | |
| 2017/0332172 | A1* | 11/2017 | Osako | H04R 3/005 |
| 2021/0397637 | A1* | 12/2021 | Zhou | G06F 16/35 |
| 2022/0124417 | A1* | 4/2022 | Sun | H04N 21/4854 |
| 2023/0146871 | A1* | 5/2023 | Cao | H03G 3/3005 |

FOREIGN PATENT DOCUMENTS

| | | |
|---|---|---|
| CN | 108854062 A | 11/2018 |
| CN | 109165091 A | 1/2019 |
| CN | 109343902 A | 2/2019 |
| CN | 110176244 A | 8/2019 |
| CN | 110704191 A | 1/2020 |
| KR | 10-2013-0106462 A | 9/2013 |

OTHER PUBLICATIONS

Written Opinion of the International Searching Authority for PCT/CN2021/131404 dated, Feb. 15, 2022 (PCT/ISA/237).
Extended European Search Report issued May 31, 2024 in European Application No. 21920712.3.
Translation of the Written Opinion issued Feb. 15, 2022 in International Application No. PCT/CN2021/131404.
Korean Office Action dated Sep. 30, 2024 in Application No. 10-2023-7027570.
Communication dated May 16, 2025 in European Application No. 21 920 712.3.

* cited by examiner

Fig. 6

| Test list 301a | | | | |
|---|---|---|---|---|
| Test terminal type | Sound quality parameter | Test processing result of the application layer | Test processing result of the terminal system layer |
| Test type T1 | Sound quality parameter D1 | First test result 31a | Second test result 31b |
| | | First test result 32a | Second test result 32b |
| | | ⋮ | |
| | | First test result 33a | Second test result 33b |
| ⋮ | | ⋮ | |
| Test type Tn | Sound quality parameter D2 | First test result 34a | Second test result 34b |
| | | First test result 35a | Second test result 35b |
| | | ⋮ | |
| | | First test result 36a | Second test result 36b |

AUDIO DATA PROCESSING METHOD AND APPARATUS, DEVICE, AND STORAGE MEDIUM

CROSS REFERENCE TO RELATED APPLICATION(S)

This application is a continuation of PCT/CN2021/131404 filed on Nov. 18, 2021 and claims priority to Chinese Patent Application No. 202110088769.3, entitled "AUDIO DATA PROCESSING METHOD AND APPARATUS, DEVICE, AND READABLE STORAGE MEDIUM" and filed on Jan. 22, 2021, both of which are incorporated herein by reference in their entireties.

FIELD

The disclosure relates to the field of computer technologies, and in particular, to an audio data processing method and apparatus, a device, a storage medium, and a program product.

BACKGROUND

Currently, a user (for example, user A) using a mobile terminal may make a system call to another user (for example, user B) through a system call mode. For example, the user A may make a system call (that is, make a phone call) to the user B through the foregoing system call mode in a telephone call scenario.

Therefore, when the user A runs a game application (for example, game application X) through the mobile terminal and makes a system call (that is, make a phone call) to the user B, an application layer of the game application X usually needs to share a system call mode of a terminal system layer of the mobile terminal. Based on this, when the mobile terminal identically turns on signal processing units (that is, voice optimization components) in a voice pre-signal processing solution in the system call mode, both the application layer and the terminal system layer perform voice optimization on a collected sound of the user A through signal processing units of the same function type (that is, voice optimization components with the same function). As a result, the voice optimization components with the same function repeatedly run, and then overheads of the system are increased. Further, because the plurality of times of repeated processing cause a problem such as sound quality loss, the voice optimization effect is reduced.

SUMMARY

Embodiments of the disclosure provide an audio data processing method and apparatus, a device, a storage medium, and a program product, to improve a voice optimization effect in a game scenario.

An aspect of an example embodiment of the disclosure provides an audio data processing method, performed by a computer device, the method including: obtaining, in a game voice mode, a signal processing result associated with a first pre-signal processing policy in an application layer of a service application, the first pre-signal processing policy including at least one first optimization component; controlling, in the application layer according to the signal processing result, a turned-on/turned-off state of a second optimization component in a second pre-signal processing policy in a terminal system layer, or a turned-on/turned-off state of a first optimization component in the first pre-signal processing policy, a first optimization component turned on in the first pre-signal processing policy being different from a second optimization component turned on in the second pre-signal processing policy. Obtaining uplink voice data of a first user corresponding to the service application in the game voice mode, and performing, based on the first optimization component turned on in the first pre-signal processing policy and the second optimization component turned on in the second pre-signal processing policy, voice optimization on the uplink voice data in the game voice mode.

An aspect of an example embodiment of the disclosure provides an audio data processing method, performed by a computer device, the method including: obtaining, in a game voice mode, a signal processing result associated with a first pre-signal processing policy in an application layer of a service application, the first pre-signal processing policy including at least one first optimization component; controlling, at the application layer according to the signal processing result, a turned-on/turned-off state of a second optimization component in a second pre-signal processing policy in a terminal system layer, the second pre-signal processing policy including at least one second optimization component.

An aspect of an example embodiment of the disclosure provides an audio data processing method, performed by a computer device, the method including: obtaining, in a game voice mode, a signal processing result associated with a first pre-signal processing policy in an application layer of a service application, the first pre-signal processing policy including at least one first optimization component; controlling, according to the signal processing result, a turned-on/turned-off state of a second optimization component in a second pre-signal processing policy in a terminal system layer, or a turned-on/turned-off state of a first optimization component in the first pre-signal processing policy, a first optimization component turned on in the first pre-signal processing policy being different from a second optimization component turned on in the second pre-signal processing policy.

An aspect of an example embodiment of the disclosure provides an audio data processing apparatus, including:

a processing result obtaining module, configured to obtain, in a game voice mode, a signal processing result associated with a first pre-signal processing policy in an application layer of a service application, the first pre-signal processing policy including at least one first optimization component;

a component control module, configured to control, in the application layer according to the signal processing result, a turned-on/turned-off state of a second optimization component in a second pre-signal processing policy in a terminal system system layer, or a turned-on/turned-off state of a first optimization component in the first pre-signal processing policy, a first optimization component turned on in the first pre-signal processing policy being different from a second optimization component turned on in the second pre-signal processing policy.

a voice optimization module, configured to obtain uplink voice data of a first user corresponding to the service application in the game voice mode, and perform, based on the first optimization component turned on in the first pre-signal processing policy and the second optimization component turned on in the second pre-signal processing policy, voice optimization on the uplink voice data in the game voice mode.

An aspect of an example embodiment of the disclosure provides an audio data processing apparatus, including:
- a processing result obtaining module, configured to obtain, in a game voice mode, a signal processing result associated with a first pre-signal processing policy in an application layer of a service application, the first pre-signal processing policy including at least one first optimization component;
- a component control module, configured to control, at the application layer according to the signal processing result, a turned-on/turned-off state of a second optimization component in a second pre-signal processing policy in a terminal system layer, the second pre-signal processing policy including at least one second optimization component.

An aspect of an example embodiment of the disclosure provides an audio data processing apparatus, including:
- a processing result obtaining module, configured to obtain, in a game voice mode, a signal processing result associated with a first pre-signal processing policy in an application layer of a service application, the first pre-signal processing policy including at least one first optimization component;
- a component control module, configured to control, according to the signal processing result, a turned-on/turned-off state of a second optimization component in a second pre-signal processing policy in a terminal system layer, or a turned-on/turned-off state of a first optimization component in the first pre-signal processing policy, a first optimization component turned on in the first pre-signal processing policy being different from a second optimization component turned on in the second pre-signal processing policy.

An aspect of an example embodiment of the disclosure provides a computer device, including: a processor and a memory,
the processor being connected to the memory, the memory being configured to store a computer program, the computer program, when executed by the processor, causing the computer device to perform the method provided in an example embodiment of the disclosure.

An aspect of an example embodiment of the disclosure provides a computer-readable storage medium, storing a computer program, the computer program being configured to be loaded and executed by a processor, to cause a computer device having the processor to perform the method provided in an example embodiment of the disclosure.

An aspect of an example embodiment of the disclosure provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to perform the method provided in an example embodiment of the disclosure.

In an example embodiment of the disclosure, the computer device (for example, mobile terminal) may control, in the application layer according to the signal processing result in the game voice mode, turn-on and turn-off of the second optimization component in the second pre-signal processing policy in the terminal system layer (that is, the voice optimization component in the second pre-signal processing policy), or turn-on and turn-off of the first optimization component in the first pre-signal processing policy (that is, the voice optimization component in the first pre-signal processing policy). It can be understood that, a first optimization component turned on in the first pre-signal processing policy is different from a second optimization component turned on in the second pre-signal processing policy. Therefore, it can be seen that, an example embodiment of the disclosure propose that turn-on or turn-off of one or more voice optimization components in the terminal system layer may be controlled in the application layer according to the foregoing signal processing result (that is, algorithm comparison results respectively corresponding to voice optimization components having the same function), so that the voice optimization components having the same optimization function may be either run in the application layer or the terminal system layer. In this way, sound quality loss of the uplink voice data may be reduced from the source. It can be understood that, the quantity and type of second optimization components turned on or turned off in the terminal system layer are not limited herein. Further, when obtaining the uplink voice data of the first user in the game voice mode, the computer device may quickly perform voice optimization on the uplink voice data in the game voice mode based on the first optimization component and the second optimization component having different functions, and then may improve the voice optimization effect in the game scenario while reducing the sound quality loss.

BRIEF DESCRIPTION OF THE DRAWINGS

To describe the technical solutions of example embodiments of the disclosure more clearly, the following briefly describes the accompanying drawings required for describing the example embodiments of the disclosure. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 6 is a schematic diagram of a scenario of a test list according to an example embodiment of the disclosure.

DESCRIPTION OF EMBODIMENTS

Figure 1:
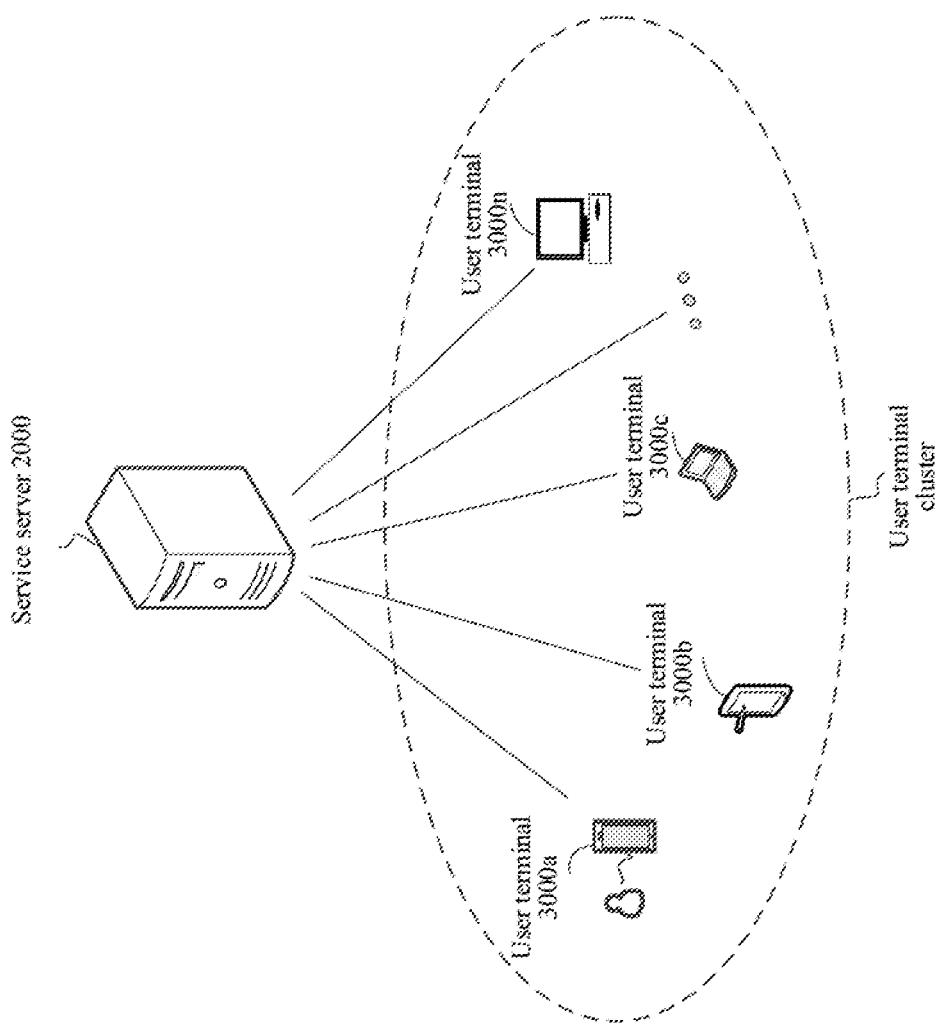
FIG. 1 is a schematic structural diagram of a network architecture according to an example embodiment of the disclosure.

Embodiments provided in the disclosure may be individually implemented, and may also be arbitrarily combined to become a new embodiment, which both belong to the protective scope of the disclosure.

Before embodiments of the disclosure are introduced and described, some technical terms related to the disclosure are first defined and described.

1. Game voice mode: It is a voice mode paralleling a media mode and a call mode and provided by a terminal system according to voice requirements and characteristics in a game application scenario.

2. Sampling rate: The sampling rate is also referred to as a sampling frequency, refers to the quantity of samples extracted from continuous signals per second and forming discrete signals, and is in the unit of hertz (Hz). A higher sampling rate indicates more precise data. Frequently used sampling rates are 8 kHz, 16 kHz, 44.1 kHz, and 48 kHz.

3. Bits of samples: The bits of samples are a sample value or sampling value, are a parameter used for measuring sound fluctuation changes, and refer to binary bits of a digital sound signal used when an audio adapter collects and plays a sound file. Frequently used bits of samples are 8 bits, 16 bits and 32 bits, and 16 bits of samples are usually used for a mobile phone platform.

4. Number of sound channels: The number of sound channels is also referred to as the number of channels, that is, the number of acoustic channels, and is usually related to a hardware device. The common numbers of sound channels include a single sound channel and a double sound channel (stereo), a sound of the single sound channel only may be produced through one speaker, a sound of the double sound channel may be produced through two speakers, and work is usually divided between a left sound channel and a right sound channel, thereby better feeling the space effect.

5. Noise suppression: Voice data collected through a voice collection tool usually not only includes valid voice data, for example, a human sound, a musical sound and the like, but also includes useless noise data, for example, an environmental sound and the like. The noise suppression is a technology for eliminating or reducing impact of noise on the entire voice effect as much as possible according to characteristics of the voice data.

6. Automatic gain control: It is an automatic control method for adjusting a gain of an amplification circuit automatically with signal strength, and is mainly used for enhancing signal strength of the valid voice data.

7. Acoustic echo cancellation: An acoustic echo refers to a sound reflected or repeated by an acoustic wave or a sound returned to a talker after a signal of the sound is transmitted and played through a network and then is collected and transmitted back again by a peer end. Canceling these sounds through a signal processing algorithm or apparatus is acoustic echo cancellation.

8. Dynamic range compression: The dynamic range compression is dynamic range control, and may dynamically adjust an audio output amplitude. When the volume is high, the volume is appropriately turned down; and when the volume is low, the volume is appropriately turned up, so that the volume is always controlled to be in an appropriate range. The dynamic range compression is usually used for controlling an audio output power, so that the sound of the speaker is not broken. Even if the sound is played at low volume, the sound can still be clearly heard.

9. Front-end processing: The voice front-end processing technology refers to a technology for first processing original voice data before being encoded and transmitted, to enable the processed voice signal to better reflect essential features of the voice. The voice front-end processing technology usually mainly includes technologies such as noise suppression, acoustic echo cancellation, automatic gain control and the like.

FIG. 1 is a schematic structural diagram of a network architecture according to an example embodiment of the disclosure. As shown in FIG. 1, the network architecture may include a service server 2000 and a user terminal cluster.

The user terminal cluster may include one or more user terminals, and the quantity of user terminals is not limited herein. As shown in FIG. 1, the plurality of user terminals herein may specifically include a user terminal 3000*a*, a user terminal 3000*b*, a user terminal 3000*c*, . . . , and a user terminal 3000*n*. As shown in FIG. 1, the user terminal 3000*a*, . . . , and the user terminal 3000*n* may each establish a network connection to the service server 2000, so that each user terminal in the user terminal cluster can exchange data with the service server 2000 through the network connection.

The service server 2000 shown in FIG. 1 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

For ease of understanding, in an example embodiment of the disclosure, one user terminal (for example, a user terminal used by a user A) may be selected from the user terminal cluster shown in FIG. 1 as a target user terminal. For example, in an example embodiment of the disclosure, the user terminal 3000*a* shown in FIG. 1 may be used as the target user terminal. The target user terminal may be integrated with service applications having an audio data processing function (for example, audio data collection and playing function). The service applications may specifically include application clients having an audio data collection and playing function such as an entertainment client (for example, game client), a social client, an office client, a live streaming client and the like. The target user terminal (for example, user terminal 3000*a*) may specifically include: a mobile terminal carrying an audio data processing function such as a smartphone, a tablet computer, a notebook computer, a wearable device and the like. In an example embodiment of the disclosure, application types corresponding to entertainment clients (for example, game client) may be collectively referred to as a game type, and application types respectively corresponding to a social client (for example, QQ, WeChat and other clients), an office client (for example, enterprise client), a live streaming client and the like may be collectively referred to as a non-game type.

It can be understood that, for a user terminal (for example, the foregoing target user terminal) on which the foregoing service applications are run, different service modes may be adaptively selected according to different application types of the service applications, so as to perform different types of voice interaction services in different service scenarios.

Figure 2:
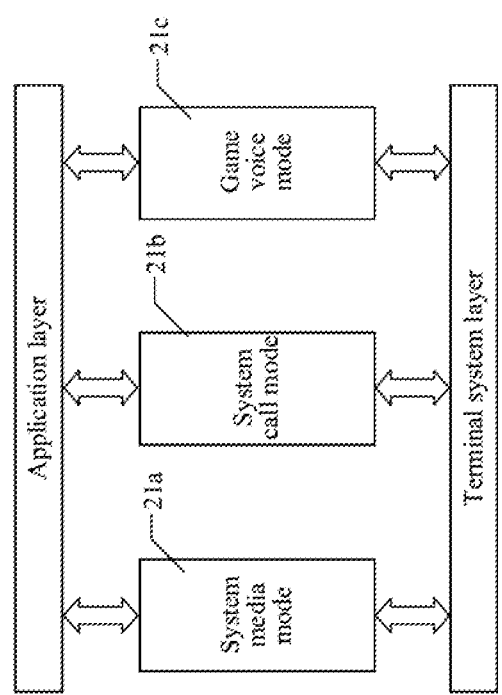
FIG. 2 is a schematic diagram of service mode division according to an example embodiment of the disclosure.

As shown in FIG. 2, service modes herein may specifically include a system media mode 21a (also referred to as "media mode"), a system call mode 21b (also referred to as "voice call mode" or "call mode") and a game voice mode 21c.

It is to be understood that, a target user terminal may configure service modes of service applications as the system media mode 21a by default in a case that a user (that is, a first user) does not need a voice double-talk requirement (that is, does not need to perform voice interaction). Optionally, the target user terminal may alternatively intelligently recognize, in a case that the user (that is, first user) needs the voice double-talk requirement (that is, needs to perform voice interaction), application types of service applications that need to perform voice interaction, and then may adaptively select different service modes according to different application types of the service applications. For example, in a case that the application types of the service applications are a game type, the service modes of the service applications are configured as the game voice mode 21c; and in a case that the application types of the service applications are a non-game type, the service modes of the service applications are configured as the system call mode 21b.

The system media mode 21a may be used for indicating that the target user terminal plays audio data of a music or video program for the current user (that is, first user).

The system call mode 21b may be used for indicating that the target user terminal causes the current user (that is, the first user) to make a system call to another user (that is, a second user, the second user may be a user requesting to make a system call and selected by the first user from a service application) through the system call mode 21b in the non-game scenario.

The game voice mode 21c may be used for indicating that the target user terminal provides a brand-new voice interaction service in the game scenario. For example, in the game voice mode 21c, the user (that is, the first user) may directly make a game voice call to another user (such as, a third user, the third user may be a game user in the same game camp as the first user in the game voice mode 21c).

Different from chat software, the voice environment in the game scenario is more complex, and consideration needs to be given to both voice call quality and media playing sound quality. The existing user terminal only provides the system call mode 21b applicable to the call scenario and the system media mode 21a applicable to the music playing scenario, but has not considered a scenario of fusing the two cases, and consequently has an undesired application effect in the game scenario. Therefore, how to improve system media playing sound quality while ensuring call experience at two voice ends becomes a key to improving voice experience of a game user. As shown in FIG. 2, in the disclosure, by providing the game voice mode 21c paralleling the system call mode 21b and the system media mode 21a, a mobile intelligent terminal optimizes the voice service in the game application scenario. A mobile application may also select the most proper voice mode according to its own service characteristics and appeals, so as to quickly and efficiently integrate a voice service in the application. The game voice mode 21c is a voice mode of an application in the game service or in the game scenario, and the mode aims to optimize voice experience of a player for the game scenario. In the game voice mode 21c, for the game application scenario, effective optimization measures are taken for links such as voice collection, processing, setting and the like, thereby providing a game player with smooth game voice and superior game sound effect experience.

The disclosure is mainly applied to the game voice industry, and therefore the voice mode newly disclosed by the disclosure is referred to as "game voice mode". It is to be understood that, the "game voice mode" is not only applicable to the game scenario, but also applicable to other service scenarios having a voice processing requirement the same as or similar to that of the game scenario, for example, applicable to all voice service scenarios that need to give consideration to both voice call quality and media playing sound quality, such as the live video streaming scenario, the video conference scenario and the like. This is not limited in the disclosure.

Figure 3:
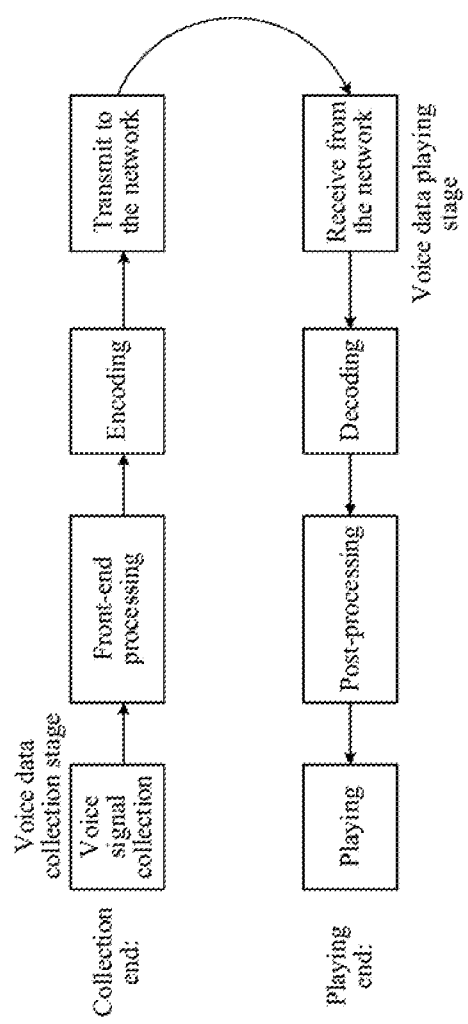
FIG. 3 is a schematic diagram of a voice data processing process according to an example embodiment of the disclosure.

Using the game scenario as an example, game voice mainly undergoes such two stages as a voice data collection stage and a voice data playing stage. FIG. 3 is a schematic diagram showing a voice data processing process.

The voice data collection stage sequentially includes:

1. Voice signal collection: A voice is usually inputted to a mobile phone through a microphone. The microphone mainly converts an acoustic wave into voltage signals, and then samples the voltage signals, thereby converting continuous voltage signals into digital signals that a computer can process. Indexes affecting quality of a collected voice signal mainly include a sampling rate, bits of samples and the number of sound channels. A higher sampling rate indicates that, the quantity of times of obtaining sound samples per second is also larger, and finally obtained audio quality is also higher.

2. Voice signal front-end processing: The data collected by the microphone is pre-processed, to improve quality of the voice data. The front-end processing process usually includes acoustic echo cancellation, automatic gain control, noise suppression and other audio processing algorithms.

3. Encoding: The voice encoding is compressing the collected digital voice signal, reducing the transmission bit rate and performing digital transmission.

4. Transmission: The transmission is transmitting the encoded voice data to a designated voice server through a network, so that other users can hear the voice data of the user through the server.

The voice data playing stage sequentially includes:

5. Receiving the voice data: It is a process of obtaining to-be-played voice data of other users from the designated voice server.

6. Decoding: The decoding is a process corresponding to the encoding, that is, the received encoded voice data is decoded, to convert the digital signal into an analog signal.

7. Post-processing: For the decoded voice data, stalling and other phenomena affecting the audio playing effect may exist in the played voice data because of packet loss and other problems, and the decoded voice data needs to be adjusted and optimized through the post-processing process.

8. Playing: The audio data is played through a speaker, a headset and other devices.

It can be understood that, the target user terminal may start a collaboration mechanism between the application layer and the terminal system layer in the game voice mode, and then may select, adaptively according to an algorithm comparison result (that is, signal processing result) and according to the collaboration mechanism, to turn on a voice optimization component having the same optimization function from voice optimization components of the application layer and voice optimization components of the terminal system layer. In this way, when the application layer and the terminal system layer perform collaborative working according to the foregoing collaboration mechanism, real-time human sound processing may be performed on uplink voice data of the current user (that is, the foregoing first user) collected in real time in the game scenario, so as to improve the voice optimization effect of the uplink voice data, thereby improving voice interaction experience between game users.

Figure 4:
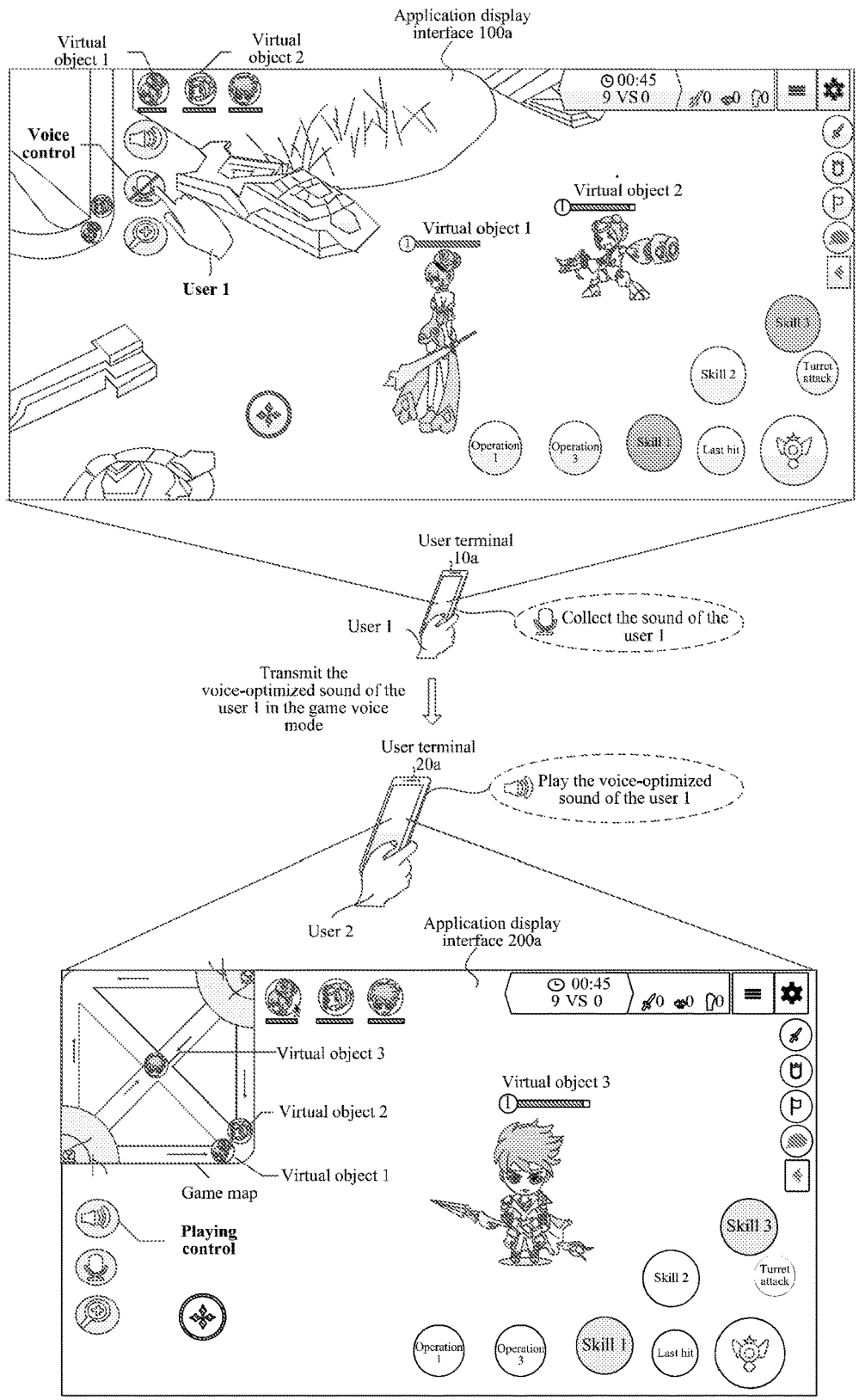
FIG. 4 is a schematic diagram of a scenario of performing voice interaction in a game scenario according to an example embodiment of the disclosure.

For ease of understanding, FIG. 4 is a schematic diagram of a scenario of performing voice interaction in a game scenario according to an embodiment of the disclosure. It can be understood that, in the game scenario, an application type of a service application in a user terminal 10a shown in FIG. 4 may be the foregoing game type. In this case, the user terminal 10a may switch a service mode of the service application from a system media mode to a game voice mode, so that a user 1 (that is, the foregoing first user) shown in FIG. 4 may make a game voice call to a user 2 (that is, the foregoing third user) shown in FIG. 4 in the game voice mode.

It can be understood that, the user terminal 10a shown in FIG. 4 may be the foregoing target user terminal having the audio data processing function. It can be understood that, when the user 1 shown in FIG. 4 needs to perform voice interaction with the user terminal 20a corresponding to the user 2 shown in FIG. 4 through the user terminal 10a, voice optimization may be performed on a collected sound of the user 1 in advance in the user terminal 10a, so that the voice-optimized sound of the user 1 may be transmitted to the user terminal 20a corresponding to the user 2 as a target voice optimization result corresponding to uplink voice data, and then the voice-optimized sound of the user 1 may be played through a speaker shown in FIG. 4 in the user terminal 20a. It can be understood that, in an example embodiment of the disclosure, sounds of the user 1 collected by a microphone (corresponding to a voice control in an application display interface 100a shown in FIG. 4) of the user terminal 10a may be collectively referred to as a voice uplink signal, that is, audio frames obtained after spectrum analysis is performed on the sound signals collected by the microphone may be collectively referred to as uplink voice data. Additionally, it can be understood that, in an example embodiment of the disclosure, the voice-optimized sound of the user 1 played by the speaker (corresponding to a playing control in an application display interface 200a shown in FIG. 4) of the user terminal 20a may be collectively referred to as a voice downlink signal, that is, audio frames of the sound signal transferred to the speaker for playing may be referred to as downlink voice data. Similarly, voice-optimized sounds of another user (for example, the user 2) played by a speaker of the user terminal 10a may also be collectively referred to as a voice downlink signal.

It can be understood that, in the game scenario, after collecting the sound (that is, the foregoing voice uplink signal) of the user 1 in real time through the microphone, the user terminal 10a shown in shown in FIG. 4 may obtain uplink voice data corresponding to the voice uplink signal, and then may perform voice optimization on the uplink voice data of the user 1 through an optimal signal processing policy jointly negotiated between the application layer of the foregoing service application and the terminal system layer, for example, according to the first optimization component turned on in the application layer and the second optimization component turned on in the terminal system layer that are jointly negotiated. The second optimization component is different from the first optimization component. Additionally, the first optimization component turned on in the application layer (that is, the first optimization component turned on in the first pre-signal processing policy) and the second optimization component turned off in the second pre-signal processing policy have the same optimization function, and the second optimization component turned on in the terminal system layer and the first optimization component turned off in the foregoing first pre-signal processing policy have the same optimization function. It is to be understood that, in an example embodiment of the disclosure, voice optimization components in the first pre-signal processing policy may be collectively referred to as the first optimization component, and voice optimization components in the second pre-signal processing policy may be collectively referred to as the second optimization component. In this way, through the collaboration mechanism between the application layer and the terminal system layer, it may be effectively ensured that voice optimization components having the same optimization function are either run on the application layer, or run on the terminal system layer, thereby effectively avoiding a problem that voice optimization components having the same optimization function are repeatedly run.

The performing the voice optimization is the front-end processing process described above, and mainly includes but not limited to performing acoustic echo cancellation (AEC), performing noise suppression (NS), and performing automatic gain control (AGC).

In the process of performing acoustic echo cancellation (AEC), an acoustic echo mainly refers to a phenomenon that a voice transmitted by a talker (for example, the foregoing user 1) to another person (for example, the foregoing user 2) through a communication device (for example, the foregoing user terminal 10a) of the talker returns to an earpiece of the talker again. The acoustic echo cancellation involved in an example embodiment of the disclosure mainly refers to a processing solution in which the target user terminal (for example, the foregoing user terminal 10a) cancels this acoustic echo through a specific algorithm apparatus (for example, acoustic echo cancellation component).

In the process of performing noise suppression (NS), noise mainly refers to a sound signal sent by another object different from the talker (for example, the foregoing user 1) and collected by the target user terminal (for example, the foregoing user terminal 10a). Based on this, the noise suppression involved in an example embodiment of the disclosure mainly refers to a processing solution in which the target user terminal (for example, the foregoing user terminal 10a) cancels this noise through a specific algorithm apparatus (for example, noise suppression component).

In the process of performing automatic gain control (AGC), the target user terminal (for example, the foregoing user terminal 10a) may intelligently adjust voice signal energy according to an auditory perception range of a person for sounds through a specific algorithm apparatus (for example, gain control component), so that the voice signal may be better perceived.

It is to be understood that, in a case that the user terminal 10a selects, through an algorithm comparison result, to turn on a first optimization component 11 (for example, acoustic echo suppression component) in the first pre-signal processing policy in the application layer, it is necessary to synchronously turn off a second optimization component 21 having the same optimization function as that of the first optimization component 11 (for example, acoustic echo suppression component) in the terminal system layer, and the second optimization component 21 may be an acoustic echo suppression component in the second pre-signal processing policy in the terminal system layer controlled by the application layer to be turned off. This means that in an example embodiment of the disclosure, when collecting a sound of the user 1 (that is, uplink voice data of the first user) in the game scenario in real time through the microphone, the target user terminal only needs to run a voice optimization component having the same optimization function in the application layer or the terminal system layer, and then it may be ensured that the function of the voice optimization component having the same optimization function is run once, thereby resolving the problem of computing resource waste caused by repeatedly running the function of the voice optimization component having the same optimization function from the source.

It can be understood that, as shown in FIG. 4, when the user 1 (herein mainly referring to a game user, for example, game user A) selects to turn on the voice control (that is, when the voice control in a turned-off state, a service mode of the service application run on the user terminal 10a may be the system media mode) shown in FIG. 4 in the application display interface 100a shown in FIG. 4, the terminal used by the user 1 (for example, the user terminal 10a shown in FIG. 4) may determine the application type of the service application run on the user terminal 10a, and then may switch the service mode of the service application from the system media mode to the game voice mode, so that the user terminal 10a may collect and optimize the sound of the user 1 in real time in the game voice mode, so as to obtain the voice-optimized sound of the user 1 shown in FIG. 4. Further, the user terminal 10a may broadcast the voice-optimized sound of the user 1 to another teammate in a camp in which the user 1 is located (for example, the user 2, the user 2 may be another game user located in the same camp as the user 1). In this way, when a terminal (for example, the user terminal 20a shown in FIG. 4) used by the another teammate in the same camp (for example, the user 2) turns on a playing control shown in FIG. 4 (for example, turns on the speaker in the game scenario), the received voice-optimized sound of the user 1 may be played.

Optionally, in a case that the foregoing user terminal 10a detects that an application type of the foregoing service application belongs to the non-game type (for example, social type), the user terminal 10a (that is, the foregoing target user terminal) may intelligently switch a service mode of the service application from the system media mode to the system call mode, so as to perform the second type of voice call service in the system call mode, where the second type of voice call service may be a voice interaction service corresponding to a system call type in the non-game scenario. For example, in a social scenario, the user 1 shown in FIG. 4 may be allowed to transmit a system call request corresponding to the system call type to the user 2 shown in FIG. 4, and then when a terminal corresponding to the user 2 shown in FIG. 4 (that is, the foregoing user terminal 20a) responds to the system call request (such as, the user 2 confirms to receive a calling request of the user 1), a system communication channel between the user 1 and the user 2 may be established, so as to make a system call through the system communication channel.

For a specific implementation in which the target user terminal (for example, the user terminal 10a shown in FIG. 4) performs control through the foregoing application layer to turn on and turn off the second optimization component in the second pre-signal processing policy in the terminal system layer, and performs voice optimization on the uplink voice data of the first user, reference may be made to the following example embodiments corresponding to FIG. 5 to FIG. 15.

Figure 5:
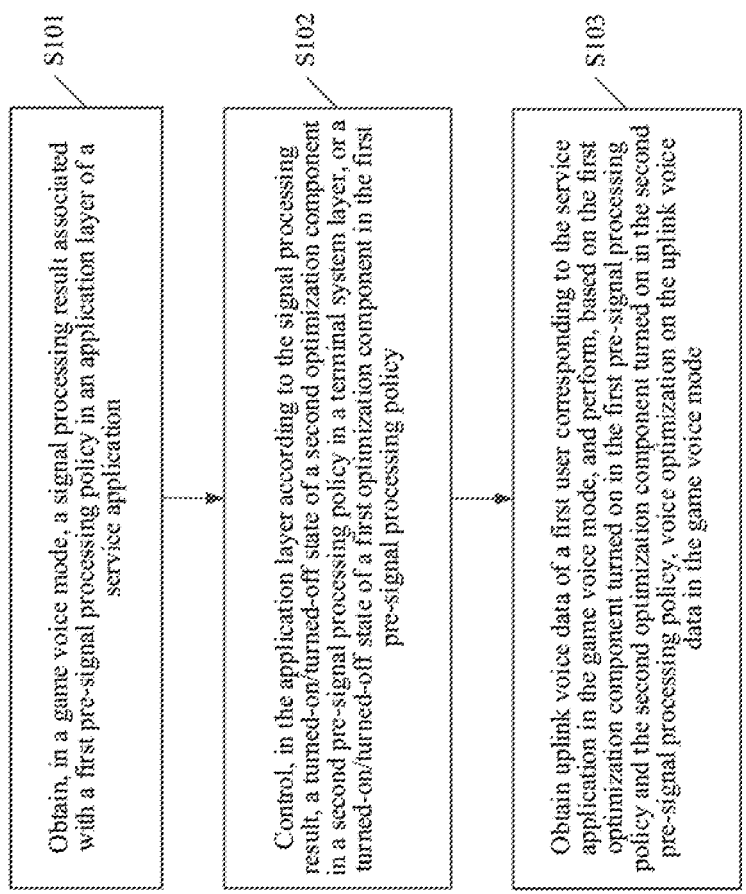
FIG. 5 is a schematic flowchart of an audio data processing method according to an example embodiment of the disclosure.

FIG. 5 is a schematic flowchart of an audio data processing method according to an example embodiment of the disclosure. The method is performed by a computer device. For example, the method may be performed by a user terminal (for example, the foregoing target user terminal, the target user terminal may be the user terminal 10a in the foregoing example embodiment corresponding to FIG. 4), or may be performed by a service server (for example, the foregoing service server 2000 shown in FIG. 1), or may be performed by a user terminal and a service server interactively and collaboratively. For ease of understanding, this example embodiment is described by using an example in which the method is performed by the user terminal. The audio data processing method may include at least one operation of the following operation S101 to operation S103:

Operation S101. Obtain, in a game voice mode, a signal processing result associated with a first pre-signal processing policy in an application layer of a service application.

Specifically, the target user terminal may obtain a sound quality index of the service application in the game voice mode, and then may configure a sound quality parameter of the service application according to the sound quality index of the service application (the sound quality parameter may include but not limited to a voice sampling rate and the number of voice channels). Further, the target user terminal obtains a terminal type of a terminal to which the service application belongs, and searches a test list associated with the service application for a test type matching the terminal type. The target user terminal may obtain, from the test list and based on the sound quality parameter in a case that a test type matching the terminal type is found by searching the test list, a first test processing result obtained by using the first pre-signal processing policy and a second test processing result obtained by using the second pre-signal processing policy. The first pre-signal processing policy is a pre-signal processing policy in the application layer of the service application. The second pre-signal processing policy is a pre-signal processing policy in a terminal system layer corresponding to a test terminal type. Further, the target user terminal may determine, based on the first test processing result and the second test processing result, an optimal signal processing policy associated with the sound quality parameter from the first pre-signal processing policy and the second pre-signal processing policy, and may use the determined optimal signal processing policy as the signal processing result associated with the first pre-signal processing policy.

It can be understood that, before the target user terminal performs operation S101, a system resource package of the service application may be further loaded into the target user terminal in advance, and then after the system resource package is parsed, system resource data of the service application may be obtained. In this way, after the target user terminal initializes the system resource data, the service mode of the service application may be initially configured as the system media mode according to the initialized system resource data. It is to be understood that, in some embodiments of the disclosure, after initialization of the system resource data is completed, the target user terminal may enter the system media mode by default, so that an application display interface of the service application may be outputted according to the initialized system resource data in the system media mode, so as to output multimedia data of the service application (for example, video frame data and audio frame data) in the application display interface. It can be understood that, the application display interface may include a voice control used for indicating that the first user initiates a voice interaction service. In this way, when the first user needs to perform voice interaction with another user, the first user may select to trigger the voice control currently in a turned-off state, so that the target user terminal may respond to a voice turn-on operation performed by the first user for the voice control, and then may automatically detect an application type of the service application initiating the voice interaction service.

It can be understood that, in a case that the target user terminal determines that an application type of the service application initiating the voice interaction service belongs to the game type, the target user terminal may determine that the current service scenario is a game scenario, and then may switch a service mode of the service application run on the target user terminal from the system media mode to the game voice mode. For example, the target user terminal generates a first voice call instruction associated with the game type in the game scenario, and may switch the service mode of the service application run on the target user terminal from the system media mode to the game voice mode based on the first voice call instruction, so that a first type of voice call service may be subsequently performed in the game voice mode. It can be understood that, the target user terminal may refine, in the game voice mode according to a sound quality index of the service application, some sound quality parameters associated with the foregoing voice double-talk requirement. For example, the target user terminal may allow the foregoing first user (that is, the user using the target user terminal) to set the voice sampling rate and the number of voice channels corresponding to the target user terminal in the game voice mode.

Optionally, it can be understood that, in a case that the target user terminal determines that the application type of the service application currently initiating the voice interaction service belongs to a non-game type, the target user terminal may determine that the current service scenario is a non-game scenario, and then may switch the service mode of the service application run on the target user terminal from the system media mode to the system voice mode. For example, the target user terminal generates a second voice call instruction associated with the non-game type in the non-game scenario, and may switch the service mode of the service application run on the target user terminal from the system media mode to the system voice mode based on the second voice call instruction, and then may perform voice interaction with another user (for example, the foregoing second user) in the system voice mode, so as to perform the foregoing second type of voice call service.

Therefore, it can be seen that, the game voice mode and the system voice mode provided in this example embodiment of the disclosure are two service modes used for providing different types of voice call services in the foregoing voice double-talk scenario. In this way, by determining the application type of the service application initiating the voice call service, the target user terminal may intelligently enter the foregoing game voice mode when the application type is the game type, so as to perform the foregoing first type of voice call service. Optionally, the target user terminal may intelligently enter the foregoing system voice mode when the application type is the non-game type, so as to perform the foregoing second type of voice call service.

It can be understood that, the target user terminal involved in this example embodiment of the disclosure may include but not limited to a mobile terminal having the foregoing voice data processing function. Therefore, the setting the voice sampling rate corresponding to the target user terminal involved in this example embodiment of the disclosure may mainly include setting an uplink sampling rate and a downlink sampling rate of the terminal. Moreover, the setting the number of voice channels of the target user terminal involved in this example embodiment of the disclosure mainly refers to setting the number of channels of voice. For example, the number of channels may be set to two according to a sound quality index of the target user terminal.

It is to be understood that, the voice sampling rate (for example, uplink sampling rate and downlink sampling rate) may be the quantity of times of sampling sound signals by a sound recording component of the target user terminal in a unit sampling period. The voice sampling rate may include but not limited to 4 kHz, 8 kHz and 48 kHz. It is to be understood that, the value of the voice sampling rate may be used for reflecting trueness and naturalness of sounds of the user that the sound recording component can restore.

For example, in the game voice mode, the first user may perform voice interaction through the voice double-talk service provided by the voice interaction system in the target user terminal. That is, when the microphone in the target user terminal is used for collecting a sound signal of the first user (that is, may be used for collecting a sound of the first user), spectrum analysis may be performed on the sound signal of the first user according to the foregoing uplink sampling rate in the game voice mode, so as to perform sampling to obtain the uplink voice data of the first user in the game voice mode. In this case, the target user terminal may perform voice optimization on the uplink voice data, and then may transmit the voice-optimized sound signal of the first user (that is, the foregoing voice-optimized sound of the first user) to another communication peer end (for example, a terminal corresponding to the foregoing third user), so as to play the foregoing voice-optimized sound of the first user in the another communication peer end through its own speaker. Similarly, the target user terminal may be further used for receiving the voice-optimized sound signal of the third user transmitted by the another communication peer end, and then downlink voice data used for being transferred to the speaker of the target user terminal may be obtained after spectrum analysis is performed on the voice-optimized sound signal of the third user according to the foregoing downlink sampling rate. In this way, when the downlink voice data is played through the speaker of the target user terminal, the voice-optimized sound of the third user may be restored accurately for the first user as much as possible.

For ease of understanding, FIG. 6 is a schematic diagram of a scenario of a test list according to an example embodiment of the disclosure. A test terminal type in the test list 301a may be test types corresponding to one or more test terminals. It can be understood that, the test terminal type may include but not limited to models of one or more brands. Optionally, the test terminal type may further include system types, system versions and the like of terminal environment systems corresponding to these models.

It can be understood that, when a developer corresponding to a service application has researched and developed a service application having the foregoing game voice mode, the service application may be integrated and installed in advance in test terminals corresponding to known models and used for performing test, so as to perform performance test using a plurality of pre-signal processing policies in these test terminals corresponding to the known models respectively (for example, the first pre-signal processing policy in the foregoing application layer and the second pre-signal processing policy in the foregoing terminal system layer), so as to obtain, through the test, optimization performance of voice optimization components of the same known model (that is, the same test type) in the application layer under a particular sound quality parameter, and optimization performance of voice optimization components with corresponding functions in the terminal system layer.

For ease of understanding, using an example in which test terminal types are models of a single brand, n (n is a positive integer) models under the brand may be a test type T1, . . . , and a test type Tn shown in FIG. 6. For example, the test type T1 may be a model 1 of a brand A, the test type T2 may be a model 2 of the brand A, the rest may be deduced by analogy, and the test type Tn may be a model n of the brand A.

It can be understood that, to test optimization performance in voice test components in the application layer and voice test components in the terminal system layer under different sound quality parameters of the same model, the developer may use, in a case that the sound quality parameter is set to a sound quality parameter D1 (for example, the uplink voice sampling rate is 8 kHz, the downlink voice sampling rate is 8 kHz, and the number of left sound channels is one), the first pre-signal processing policy in the application layer and the second pre-signal processing policy in the terminal system layer, to perform test to obtain a voice test effect of a test terminal whose model is the test type T1 under the sound quality parameter D1.

For example, in the process of performing performance test, test processing results obtained by performing test optimization on uplink voice data (for example, uplink voice data R1 used for performing performance test) using the voice optimization components in the foregoing application layer (for example, the first optimization components such as the first acoustic echo cancellation component configured to perform acoustic echo cancellation, the first noise suppression component configured to perform noise suppression and the first gain control component configured to perform gain adjustment) may be test processing results of the application layer associated with the sound quality parameter D1 shown in FIG. 6. Moreover, test processing results obtained by performing test optimization on the same uplink voice data R1 using the voice optimization components in the foregoing terminal system layer (for example, the second optimization components such as the second acoustic echo cancellation component configured to perform acoustic echo cancellation, the second noise suppression component configured to perform noise suppression and the second gain control component configured to perform gain adjustment) may be test processing results of the terminal system layer associated with the sound quality parameter D1 shown in FIG. 6.

For ease of understanding, in this example embodiment of the disclosure, it may be assumed that the test processing result corresponding to the first acoustic echo cancellation component in the application layer may be a first test result 31a shown in FIG. 6. In this case, the voice optimization component having the same optimization function as that of the foregoing first acoustic echo cancellation component in the terminal system layer may be the foregoing second acoustic echo cancellation component. As shown in FIG. 6, the test processing result obtained after performing acoustic echo cancellation on the uplink voice data R1 using the second acoustic echo cancellation component may be a second test result 31b shown in FIG. 6.

In another example, the test processing result corresponding to the first noise suppression component in the application layer may be a first test result 32a shown in FIG. 6. In this case, the voice optimization component having the same optimization function as that of the foregoing first noise suppression component in the terminal system layer may be the foregoing second noise suppression component. As shown in FIG. 6, the test processing result obtained after performing noise suppression on the uplink voice data R1 using the second noise suppression component may be a second test result 32b shown in FIG. 6.

In another example, the test processing result corresponding to the first gain control component in the application layer may be a first test result 33a shown in FIG. 6. In this case, the voice optimization component having the same optimization function as that of the foregoing first gain control component in the terminal system layer may be the foregoing second gain control component. As shown in FIG. 6, the test processing result obtained after performing gain adjustment on the uplink voice data R1 using the second noise suppression component may be a second test result 33b shown in FIG. 6.

Moreover, the rest may be deduced by analogy. As shown in FIG. 6, the developer may further use, in a case that the sound quality parameter is set to a sound quality parameter D2 (for example, the uplink voice sampling rate is 8 kHz, the downlink voice sampling rate is 16 kHz, and the number of left sound channels is one), the first pre-signal processing policy in the application layer and the second pre-signal processing policy in the terminal system layer, to perform test to obtain a voice test effect of another test terminal whose model is the test type Tn under the sound quality parameter D2.

For example, in the process of performing another performance test, test processing results obtained by performing test optimization on another uplink voice data (for example, uplink voice data R2 used for performing performance test) using the voice optimization components in the foregoing application layer (for example, the first optimization components such as the first acoustic echo cancellation component configured to perform acoustic echo cancellation, the first noise suppression component configured to perform noise suppression and the first gain control component configured to perform gain adjustment) may be test processing results of the application layer associated with the sound quality parameter D2 shown in FIG. 6. Moreover, test processing results obtained by performing test optimization on the same uplink voice data R2 using the voice optimization components in the foregoing terminal system layer (for example, the second optimization components such as the second acoustic echo cancellation component configured to perform acoustic echo cancellation, the second noise suppression component configured to perform noise suppression and the second gain control component configured to perform gain adjustment) may be test processing results of the terminal system layer associated with the sound quality parameter D2 shown in FIG. 6.

Similarly, for ease of understanding, in this example embodiment of the disclosure, it may be assumed that the test processing result corresponding to the first acoustic echo cancellation component in the application layer may be a first test result 34a shown in FIG. 6. In this case, the voice optimization component having the same optimization function as that of the foregoing first acoustic echo cancellation component in the terminal system layer may be the foregoing second acoustic echo cancellation component. As shown in FIG. 6, the test processing result obtained after performing acoustic echo cancellation on the uplink voice data R2 using the second acoustic echo cancellation component may be a second test result 34b shown in FIG. 6.

Similarly, the test processing result corresponding to the first noise suppression component in the application layer may be a first test result 35a shown in FIG. 6. In this case, the voice optimization component having the same optimization function as that of the foregoing first noise suppression component in the terminal system layer may be the foregoing second noise suppression component. As shown in FIG. 6, the test processing result obtained after performing noise suppression on the uplink voice data R1 using the second noise suppression component may be a second test result 35b shown in FIG. 6.

Similarly, the test processing result corresponding to the first gain control component in the application layer may be a first test result 36a shown in FIG. 6. In this case, the voice optimization component having the same optimization function as that of the foregoing first gain control component in the terminal system layer may be the foregoing second gain control component. As shown in FIG. 6, the test processing result obtained after performing gain adjustment on the uplink voice data R2 using the second gain control component may be a second test result 36b shown in FIG. 6.

To sum up, after the target user terminal perform performance test on the first optimization component in the application layer and the second optimization component having the same optimization function in the terminal system layer, test processing results of known models under different sound quality parameters may be obtained through preliminary test. Then, the developer may construct the foregoing test list 301a in FIG. 6 according to the test terminal types, the sound quality parameters, the test processing results in the application layer and the test processing results in the terminal system layer. In this way, when the first user needs to perform the foregoing voice interaction service with another user under the foregoing game voice mode, the test list 301 may be intelligently and quickly searched, according to a terminal type of a terminal (that is, the foregoing target user terminal) to which the service application currently belongs, for a test type matching the terminal type. For example, the target user terminal may quickly obtain, based on a sound quality parameter that is set by the current user (that is, the foregoing first user) according to the sound quality index of the service application (for example, the sound quality parameter set by the first user is the foregoing sound quality parameter D1), the first test processing result obtained using the foregoing first pre-signal processing policy and the second test processing result obtained using the foregoing second pre-signal processing policy from the test list 301a. It can be understood that, in this case, after comparing the test results of the voice optimization components having the same optimization function, the target user terminal may quickly determine, from the first pre-signal processing policy and the second pre-signal processing policy according to the voice test effects of the voice optimization components having the same optimization function, an optimal signal processing policy corresponding to the optimization functions of the current terminal type (that is, current model) under the particular sound quality parameter, and then the determined optimal signal processing policy may be used as a signal processing result associated with the first pre-signal processing policy, so that the following operation S102 may continue to be performed subsequently.

For example, in a case that the sound quality parameter set by the first user (that is, current user) according to the sound quality index is the foregoing sound quality parameter D1 shown in FIG. 6, the first test processing result may specifically include the first test result 31a corresponding to the foregoing first acoustic echo cancellation component (that is, AEC component in the application layer), the first test result 32a corresponding to the foregoing first noise suppression component (that is, NS component in the application layer), and the first test result 33a corresponding to the foregoing first gain control component (that is, AGC component in the application layer). The second test processing result may specifically include the second test result 31b corresponding to the foregoing second acoustic echo cancellation component (that is, AEC component in the terminal system layer), the second test result 32b corresponding to the foregoing second noise suppression component (that is, NS component in the terminal system layer), and the second test result 33b corresponding to the foregoing second gain control component (that is, AGC component in the terminal system layer).

Similarly, in a case that the sound quality parameter set by the first user according to the sound quality index is another sound quality parameter shown in FIG. 6 (for example, the foregoing sound quality parameter D2), the first test processing result obtained using the first pre-signal processing policy and the second test processing result obtained using the second pre-signal processing policy may be similarly obtained quickly from the foregoing test list 301a. The first test processing results associated with other sound quality parameters, and the second test processing results associated with the other sound quality parameters are not enumerated herein.

Operation S102. Control, in the application layer according to the signal processing result, a turned-on/turned-off state of a second optimization component in a second pre-signal processing policy in a terminal system layer, or a turned-on/turned-off state of a first optimization component in the first pre-signal processing policy.

Optionally, on and off of a second optimization component in a second pre-signal processing policy in a terminal system layer, or on and off of a first optimization component in the first pre-signal processing policy are controlled in the application layer according to the signal processing result, where the first pre-signal processing policy includes at least one first optimization component, and the second pre-signal processing policy includes at least one second optimization component. In an example embodiment, the quantity of first optimization components included by the first pre-signal processing policy and the quantity of second optimization components included by the second pre-signal processing policy are the same, and are both, for example, 3. Moreover, in the second pre-signal processing policy, there is a second optimization component having the same optimization function as that of each first optimization component in the first pre-signal processing policy; and correspondingly, in the first pre-signal processing policy, there is a first optimization component having the same optimization function as that of each second optimization component in the second pre-signal processing policy.

Optionally, a first optimization component turned on in the first pre-signal processing policy is different from a second optimization component turned on in the second pre-signal processing policy.

Optionally, the first optimization component turned on in the first pre-signal processing policy and the voice optimization component turned off in the second pre-signal processing policy have the same optimization function, and the second optimization component turned on in the second pre-signal processing policy and the first optimization component turned off in the first pre-signal processing policy have the same optimization function.

Specifically, the target user terminal determines, according to the signal processing result, the second optimization component turned on in the second pre-signal processing policy, and a second optimization component turned off in the second pre-signal processing policy. For example, the target user terminal may start, according to the foregoing signal processing result, a collaboration mechanism between the application layer and the terminal system layer of the terminal to which the service application belongs, and then may control, in the application layer based on the collaboration mechanism, turn-on and turn-off of the second optimization component in the second pre-signal processing policy in the terminal system layer. Further, the target user terminal may use, in the application layer, the second optimization component turned off in the second pre-signal processing policy as a first collaboration component, and turn on, in the first pre-signal processing policy, a first optimization component having the same optimization function as that of the first collaboration component. Further, the target user terminal may use, in the application layer, the second optimization component turned on in the second pre-signal processing policy as a second collaboration component, and turn off, in the first pre-signal processing policy, a first optimization component having the same optimization function as that of the second collaboration component.

It can be understood that, the first optimization component in the first pre-signal processing policy may include at least one of the following voice optimization algorithms: the first acoustic echo cancellation algorithm used for performing acoustic echo cancellation in the application layer (the first optimization component corresponding to the first acoustic echo cancellation algorithm is the foregoing first acoustic echo cancellation component), the first noise suppression algorithm used for performing noise suppression in the application layer (the first optimization component corresponding to the first noise suppression algorithm is the foregoing first noise suppression component), and the first gain control algorithm used for performing gain adjustment in the application layer (the first optimization component corresponding to the first gain control algorithm is the foregoing first gain control component). Similarly, the second optimization component in the second pre-signal processing policy may include at least one of the following voice optimization algorithms: the second acoustic echo cancellation algorithm used for performing acoustic echo cancellation in the terminal system layer (the second optimization component corresponding to the second acoustic echo cancellation algorithm is the foregoing second acoustic echo cancellation component), the second noise suppression algorithm used for performing noise suppression in the terminal system layer (the second optimization component corresponding to the second noise suppression algorithm is the foregoing second noise suppression component), and the second gain control algorithm used for performing gain adjustment in the terminal system layer (the second optimization component corresponding to the second gain control algorithm is the foregoing second gain control component).

In this case, the signal processing result obtained by the target user terminal may be obtained by the following operations: obtaining a first acoustic echo cancellation result corresponding to the first acoustic echo cancellation algorithm from the first test processing result, and obtaining a second acoustic echo cancellation result corresponding to the second acoustic echo cancellation algorithm from the second test processing result; and then selecting, based on the first acoustic echo cancellation result and the second acoustic echo cancellation result, an optimal acoustic echo cancellation algorithm from the first acoustic echo cancellation algorithm and the second acoustic echo cancellation algorithm, and using the optimal acoustic echo cancellation algorithm as a first optimal signal processing policy associated with the sound quality parameter. Further, the target user terminal may obtain a first noise suppression result corresponding to the first noise suppression algorithm from the first test processing result, and obtain a second noise suppression result corresponding to the second noise suppression algorithm from the second test processing result; then may select, based on the first noise suppression result and the second noise suppression result, an optimal noise suppression algorithm from the first noise suppression algorithm and the second noise suppression algorithm; and then may use the optimal noise suppression algorithm as a second optimal signal processing policy associated with the sound quality parameter. Further, the target user terminal may obtain a first gain control result corresponding to the first gain control algorithm from the first test processing result, and obtain a second gain control result corresponding to the second gain control algorithm from the second test processing result; then may select, based on the first gain control result and the second gain control result, an optimal gain control algorithm from the first gain control algorithm and the second gain control algorithm; and then may use the optimal gain control algorithm as a third optimal signal processing policy associated with the sound quality parameter. Further, the target user terminal may determine the first optimal signal processing policy, the second optimal signal processing policy, and the third optimal signal processing policy as the signal processing result associated with the first pre-signal processing policy.

Figure 7:
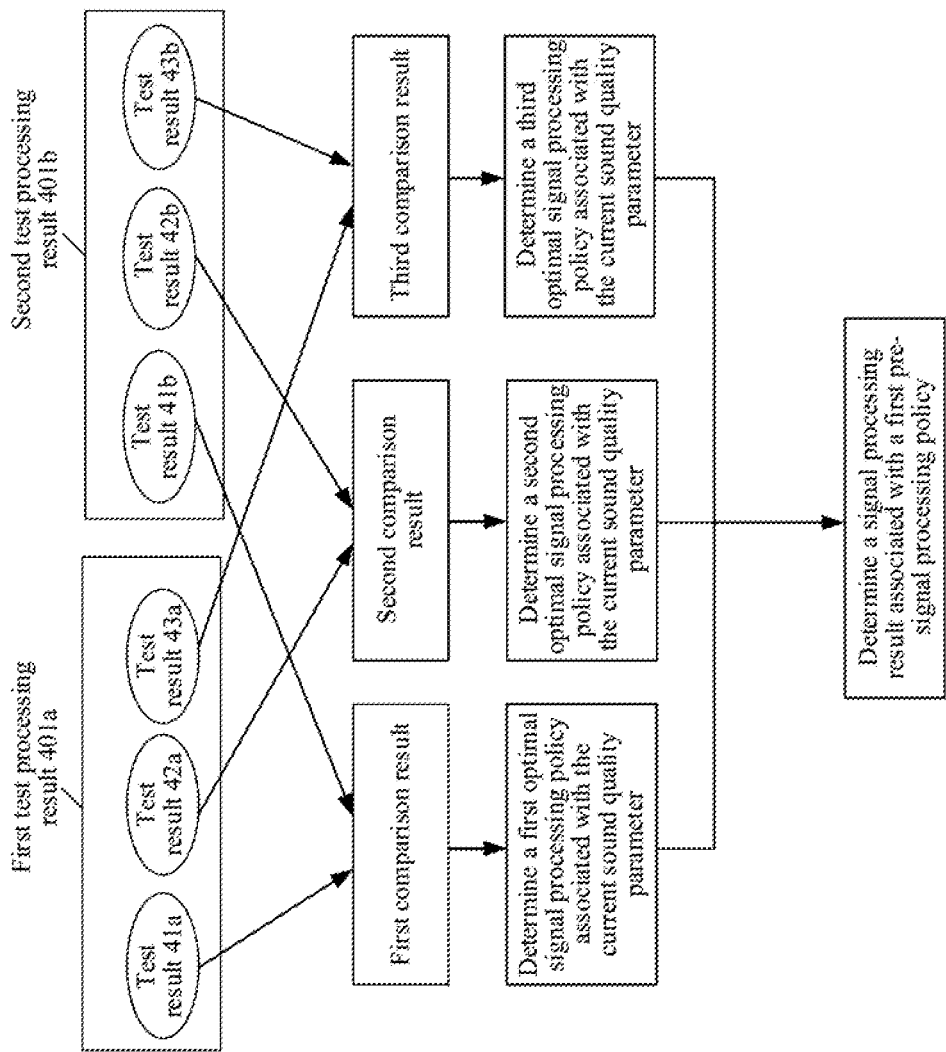
FIG. 7 is a schematic diagram of a scenario of determining an optimal signal processing policy associated with a sound quality parameter according to an example embodiment of the disclosure.

For ease of understanding, FIG. 7 is a schematic diagram of a scenario of determining an optimal signal processing policy associated with a sound quality parameter according to an example embodiment of the disclosure. A first test processing result 401a shown in FIG. 7 may be the test processing result of the application layer associated with the sound quality parameter D1 in the foregoing example embodiment corresponding to FIG. 6 (that is, the first test processing result associated with the sound quality parameter D1). A test result 41a in the first test processing result 401a may be the first test result 31a in the foregoing example embodiment corresponding to FIG. 6, that is, the test result 41a shown in FIG. 7 may be the first acoustic echo cancellation result corresponding to the first acoustic echo cancellation algorithm obtained from the first test processing result 401a. A test result 42a in the first test processing result 401a may be the first test result 32a in the foregoing example embodiment corresponding to FIG. 6, that is, the test result 42a shown in FIG. 7 may be the first noise suppression result corresponding to the first noise suppression algorithm obtained from the first test processing result 401a. A test result 43a in the first test processing result 401a may be the first test result 33a in the foregoing example embodiment corresponding to FIG. 6, that is, the test result 43a shown in FIG. 7 may be the first gain control result corresponding to the first gain control algorithm obtained from the first test processing result 401a.

A second test processing result 401b shown in FIG. 7 may be the test processing result of the terminal system layer associated with the sound quality parameter D1 in the foregoing example embodiment corresponding to FIG. 6 (that is, the second test processing result associated with the sound quality parameter D1). A test result 41b in the second test processing result 401b may be the second test result 31b in the foregoing example embodiment corresponding to FIG. 6, that is, the test result 41b shown in FIG. 7 may be the second acoustic echo cancellation result corresponding to the second acoustic echo cancellation algorithm obtained from the second test processing result 401b. A test result 42b in the second test processing result 401b may be the second test result 32b in the foregoing example embodiment corresponding to FIG. 6, that is, the test result 42b shown in FIG. 7 may be the second noise suppression result corresponding to the second noise suppression algorithm obtained from the second test processing result 401b. A test result 43b in the first test processing result 401b may be the second test result 33b in the foregoing example embodiment corresponding to FIG. 6, that is, the test result 43b shown in FIG. 7 may be the second gain control result corresponding to the second gain control algorithm obtained from the second test processing result 401b.

It can be understood that, a specific process in which the target user terminal determines the first optimal signal processing policy according to the first acoustic echo cancellation result (for example, the foregoing test result 41a shown in FIG. 7) and the second acoustic echo cancellation result (for example, the foregoing test result 41b shown in FIG. 7) may be described as follows: The target user terminal may obtain the first acoustic echo cancellation result corresponding to the first acoustic echo cancellation algorithm from the first test processing result, and obtain the second acoustic echo cancellation result corresponding to the second acoustic echo cancellation algorithm from the second test processing result. Further, the target user terminal may perform a first comparison between optimization quality corresponding to the first acoustic echo cancellation result and optimization quality corresponding to the second acoustic echo cancellation result, to obtain a first comparison result. It can be understood that, as shown in FIG. 7, the target user terminal may determine, according to the test result 41a and the test result 41b, voice test effects of the first optimization component and the second optimization component having the same optimization function. For example, by comparing a voice test effect V11 in the application layer of the first acoustic echo cancellation component in the application layer and a voice test effect V12 in the terminal system layer of the second acoustic echo cancellation component in the terminal system layer, whether the test result 41a is better than the test result 41b may be determined. In this way, in a case that the first comparison result shown in FIG. 7 indicates that the test result 41a is better than the test result 41b, it indicates that the optimization quality corresponding to the first acoustic echo cancellation result is better than the optimization quality corresponding to the second acoustic echo cancellation result, and then the first acoustic echo cancellation algorithm in the first pre-signal processing policy may be used as the first optimal signal processing policy associated with the sound quality parameter; otherwise, in a case that the first comparison result shown in FIG. 7 indicates that the test result 41b is better than the test result 41a, it indicates that the optimization quality corresponding to the second acoustic echo cancellation result is better than the optimization quality corresponding to the first acoustic echo cancellation result, and then the second acoustic echo cancellation algorithm in the second pre-signal processing policy may be used as the first optimal signal processing policy associated with the sound quality parameter. Optionally, it is to be understood that, in a case that the test result 41a is the same as the test result 41b, the first acoustic echo cancellation algorithm in the first pre-signal processing policy or the second acoustic echo cancellation algorithm in the second pre-signal processing policy may be used as the first optimal signal processing policy.

It can be understood that, a specific process in which the target user terminal determines the second optimal signal processing policy according to the first noise suppression result (for example, the foregoing test result 42a shown in FIG. 7) and the second noise suppression result (for example, the foregoing test result 42b shown in FIG. 7) may be described as follows: The target user terminal may obtain the first noise suppression result corresponding to the first noise suppression algorithm from the first test processing result, and obtain the second noise suppression result corresponding to the second noise suppression algorithm from the second test processing result. Further, the target user terminal may perform a second comparison between optimization quality corresponding to the first noise suppression result and optimization quality corresponding to the second noise suppression result, to obtain a second comparison result. It can be understood that, as shown in FIG. 7, the target user terminal may determine, according to the test result 42a and the test result 42b, voice test effects of voice optimization components having the same optimization function. For example, by comparing a voice test effect V21 in the application layer of the first noise suppression component in the application layer and a voice test effect V22 in the terminal system layer of the second noise suppression component in the terminal system layer, whether the test result 42a is better than the test result 42b may be determined. In this way, in a case that the second comparison result shown in FIG. 7 indicates that the test result 42a is better than the test result 42b, it indicates that the optimization quality corresponding to the first noise suppression result is better than the optimization quality corresponding to the second noise suppression result, and then the first noise suppression algorithm in the first pre-signal processing policy may be used as the second optimal signal processing policy associated with the sound quality parameter; otherwise, in a case that the second comparison result shown in FIG. 7 indicates that the test result 42b is better than the test result 42a, it indicates that the optimization quality corresponding to the second noise suppression result is better than the optimization quality corresponding to the first noise suppression result, and then the target user terminal may use the second noise suppression algorithm in the second pre-signal processing policy as the second optimal signal processing policy associated with the sound quality parameter. Similarly, optionally, in a case that the test result 42a is the same as the test result 42b, the first noise suppression algorithm in the first pre-signal processing policy or the second noise suppression algorithm in the second pre-signal processing policy may be used as the second optimal signal processing policy.

It can be understood that, a specific process in which the target user terminal determines the third optimal signal processing policy according to the first gain control result (for example, the foregoing test result 43a shown in FIG. 7) and the second gain control result (for example, the foregoing test result 43b shown in FIG. 7) may be described as follows: The target user terminal may obtain the first gain control result corresponding to the first gain control algorithm from the first test processing result, and obtain the second gain control result corresponding to the second gain control algorithm from the second test processing result. Further, the target user terminal may perform a third comparison between optimization quality corresponding to the first gain control result and optimization quality corresponding to the second gain control result, to obtain a third comparison result. It can be understood that, as shown in FIG. 7, the target user terminal may determine, according to the test result 43a and the test result 43b, voice test effects of voice optimization components having the same optimization function. For example, by comparing a voice test effect V31 in the application layer of the first gain control component in the application layer and a voice test effect V32 in the terminal system layer of the second gain control component in the terminal system layer, whether the test result 43a is better than the test result 43b may be determined. In this way, in a case that the third comparison result shown in FIG. 7 indicates that the test result 43a is better than the test result 43b, it indicates that the optimization quality corresponding to the first gain control result is better than the optimization quality corresponding to the second gain control result, and then the first gain control algorithm in the first pre-signal processing policy may be used as the third optimal signal processing policy associated with the sound quality parameter; otherwise, in a case that the second comparison result shown in FIG. 7 indicates that the test result 43b is better than the test result 43a, it indicates that the optimization quality corresponding to the second gain control result is better than the optimization quality corresponding to the first gain control result, and then the second gain control algorithm in the second pre-signal processing policy may be used as the third optimal signal processing policy associated with the sound quality parameter. Similarly, optionally, in a case that the test result 43a is the same as the test result 43b, the first gain control algorithm in the first pre-signal processing policy or the second gain control algorithm in the second pre-signal processing policy may be used as the third optimal signal processing policy.

Optionally, it can be understood that, in a case that the target user terminal has not found a test type matching the current terminal type by searching a test list (for example, the foregoing test list 301a), the target user terminal may determine that the current terminal type belongs to a new model; and therefore when obtaining uplink voice data (for example, the foregoing voice data R3) of the first user through the microphone in the game voice mode, may further perform voice optimization (that is, perform real-time voice optimization) on the uplink voice data (for example, the foregoing voice data R3) through the first pre-signal processing policy, so as to obtain the first voice optimization result in real time, and may perform voice optimization (that is, perform real-time voice optimization) on the uplink voice data (for example, the foregoing voice data R3) through the second pre-signal processing policy, so as to obtain the second voice optimization result in real time.

Further, the target user terminal may determine, based on the first voice optimization result and the second voice optimization result, an optimal signal processing policy associated with the sound quality parameter from the first pre-signal processing policy and the second pre-signal processing policy, and then may use the determined optimal signal processing policy as the signal processing result associated with the first pre-signal processing policy.

It can be understood that, in a case of determining that its own model does not belongs to a new model, the target user terminal may perform, in the foregoing game scenario through the voice optimization controls in the application layer, real-time voice optimization on the foregoing voice data of the first user obtained in real time, and then may obtain the first voice optimization results corresponding to the voice optimization controls in the application layer. Similarly, the target user terminal may further perform, in the foregoing game scenario through the voice optimization controls in the terminal system layer, real-time voice optimization on the foregoing voice data of the first user obtained in real time, and then may obtain the second voice optimization results corresponding to the voice optimization controls in the terminal system layer. For a specific implementation in which the target user terminal compares the voice optimization effects of the voice optimization components having the same optimization function, reference may be made to the foregoing description about the voice test effects of the voice optimization components having the same optimization function, and details do not continue to be described again herein.

The first optimization component in the first pre-signal processing policy may include at least one of the following: the foregoing first acoustic echo cancellation component, the foregoing first noise suppression component and the foregoing first gain control component. The second optimization component in the second pre-signal processing policy may include at least one of the following: the foregoing second acoustic echo cancellation component, the foregoing second noise suppression component and the foregoing second gain control component. The first acoustic echo cancellation component and the second acoustic echo cancellation component may be both configured to perform acoustic echo cancellation; the first noise suppression component and the second noise suppression component may be both configured to perform noise suppression; and the first gain control component and the second gain control component may be both configured to perform gain adjustment.

To avoid repeatedly running the voice optimization components having the same optimization function in the application layer and the terminal system layer, this example embodiment of the disclosure proposes that a corresponding switch may be provided in the game voice mode, for the foregoing application layer to control turn-on and turn-off of each part (that is, each voice optimization component) in the pre-signal processing solution, so as to ensure that the voice optimization components having the same optimization function are either run in the application layer, or run in the terminal system layer. In this way, in the real-time voice optimization (that is, real-time human sound optimization) process in the game scenario, performance consumption of the entire human sound optimization process may be reduced, and then the voice interaction experience in the game scenario may be improved. Moreover, in this example embodiment of the disclosure, in the game voice mode, waste of terminal system resources (for example, computing resources of a central processing unit (CPU)) may be further avoided, thereby effectively reducing power consumption of the terminal.

Figure 8:
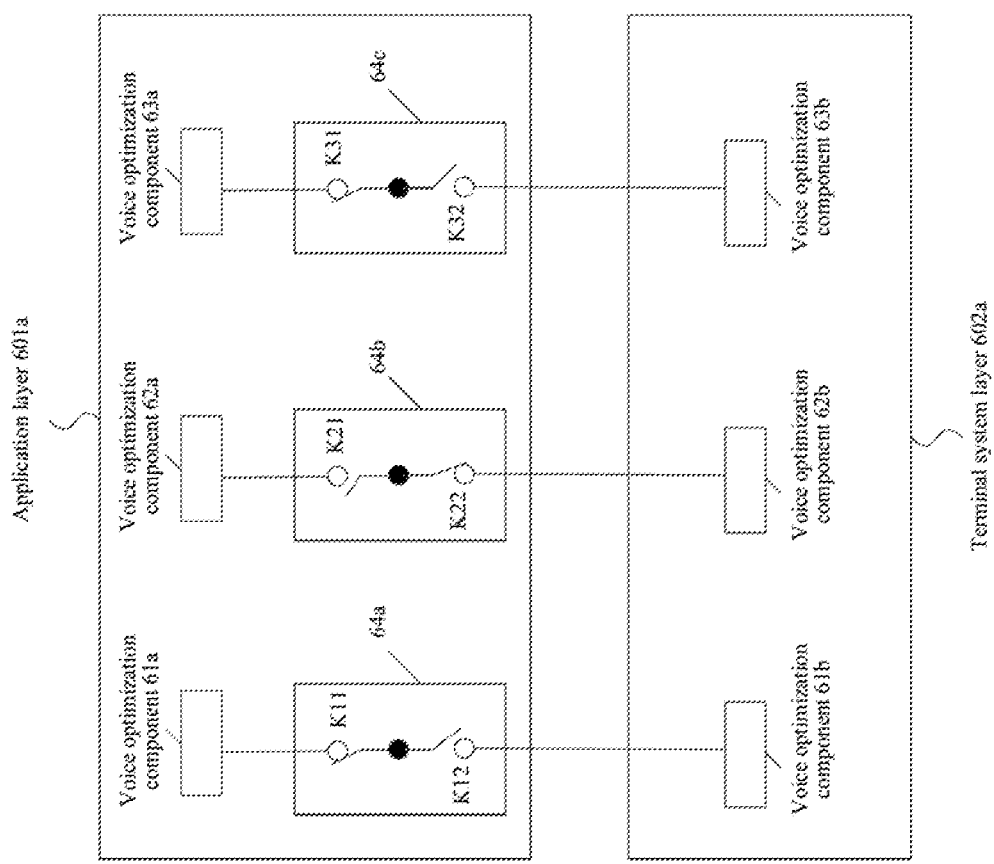
FIG. 8 is a schematic diagram of a scenario of controlling turn-on and turn-off of each voice optimization component in a voice pre-signal processing solution according to an example embodiment of the disclosure.

For ease of understanding, FIG. 8 is a schematic diagram of a scenario of controlling turn-on and turn-off of each voice optimization component in a voice pre-signal processing solution according to an example embodiment of the disclosure. It is to be understood that, the voice pre-signal processing solution may be related processing made by the foregoing target user terminal to improve clarity, loudness and the like of uplink voice data. For example, the related processing may include acoustic echo cancellation, noise suppression, automatic gain control and the like. For ease of understanding, using an example in which the voice pre-signal processing solution includes the foregoing first pre-signal processing policy and the foregoing second pre-signal processing policy, a specific process of controlling turn-on and turn-off of each voice optimization component in the voice pre-signal processing solution in the application layer is stated.

An application layer 601a shown in FIG. 8 may be the application layer of the foregoing service application, and a voice pre-signal processing solution corresponding to the application layer 601a may be the foregoing first pre-signal processing policy. In this way, first optimization components in the first pre-signal processing policy include at least: a voice optimization component 61a, a voice optimization component 62a, and a voice optimization component 63a shown in FIG. 8. It is to be understood that, the voice optimization component 61a shown in FIG. 8 may be the foregoing first acoustic echo cancellation component configured to perform acoustic echo cancellation; similarly, the voice optimization component 62a shown in FIG. 8 may be the foregoing first noise suppression component configured to perform noise suppression; and similarly, the voice optimization component 63a shown in FIG. 8 may be the foregoing first gain control component configured to perform gain adjustment.

A terminal system layer 602a shown in FIG. 8 may be an underlying system layer of a terminal (that is, the foregoing target user terminal) to which the foregoing service application belongs, and a voice pre-signal processing solution corresponding to the terminal system layer 602a may be the foregoing second pre-signal processing policy. In this way, second optimization components in the second pre-signal processing policy include at least: a voice optimization component 61b, a voice optimization component 62b, and a voice optimization component 63b shown in FIG. 8. It is to be understood that, the voice optimization component 61b shown in FIG. 8 may be the foregoing second acoustic echo cancellation component configured to perform acoustic echo cancellation; similarly, the voice optimization component 62b shown in FIG. 8 may be the foregoing second noise suppression component configured to perform noise suppression; and similarly, the voice optimization component 63b shown in FIG. 8 may be the foregoing second gain control component configured to perform gain adjustment.

It is to be understood that, to avoid repeatedly running voice optimization components having the same function, this example embodiment of the disclosure proposes that a corresponding switch may be provided in the application layer 601a shown in FIG. 8, to help the application layer 601a control turn-on and turn-off of voice optimization components in the terminal system layer 602a shown in FIG. 8.

For example, a switch K11 in the application layer 601a shown in FIG. 8 may be configured to control the voice optimization component 61a shown in FIG. 8, and a switch K12 in the application layer may be configured to control the voice optimization component 61b in the terminal system layer 602a shown in FIG. 8. It can be understood that, because the voice optimization component 61a in the application layer 601a shown in FIG. 8 and the voice optimization component 61b in the terminal system layer 602a shown in FIG. 8 have the same optimization function, the target user terminal may select, according to a collaboration mechanism (which may also be referred to as a negotiation mechanism) between the application layer 601a and the terminal system layer 602a, whether to control turn-on (or turn-off) of the voice optimization component 61b in the second pre-signal processing policy in the terminal system layer 602a in the application layer 601a. For example, as shown in FIG. 8, the target user terminal may control turn-on of the voice optimization component 61a in the first pre-signal processing policy in the application layer 601a, that is, the target user terminal may generate a first control instruction used for controlling a service switch 64a to close the switch K11 and open the switch K12. In this case, the first control instruction may be used for instructing the target user terminal to use the second optimization component (for example, the voice optimization component 61b in FIG. 8) turned off in the second pre-signal processing policy as a first collaboration component, and the first optimization component (for example, the voice optimization component 61a shown in FIG. 8) having the same optimization function as that of the first collaboration component may be turned on in the first pre-signal processing policy.

Similarly, a switch K21 in the application layer 601a may be configured to control the voice optimization component 62a shown in FIG. 8, and a switch K22 in the application layer may be configured to control the voice optimization component 62b in the terminal system layer 602a shown in FIG. 8. It can be understood that, because the voice optimization component 62a in the application layer 601a shown in FIG. 8 and the voice optimization component 62b in the terminal system layer 602a shown in FIG. 8 have the same optimization function, the target user terminal may select, according to a collaboration mechanism (which may also be referred to as a negotiation mechanism) between the application layer 601a and the terminal system layer 602a, whether to control turn-on (or turn-off) of the voice optimization component 62b in the second pre-signal processing policy in the terminal system layer 602a in the application layer 601a. For example, as shown in FIG. 8, the target user terminal may control turn-on of the voice optimization component 62a in the second pre-signal processing policy in the application layer 601a, that is, the target user terminal may generate a second control instruction used for controlling a service switch 64b to close the switch K22 and open the switch K21. In this case, the second control instruction may be used for instructing the target user terminal to use the second optimization component (for example, the voice optimization component 62b in FIG. 8) turned on in the second pre-signal processing policy as a second collaboration component, and the first optimization component (for example, the voice optimization component 62a shown in FIG. 8) having the same optimization function as that of the second collaboration component may be turned off in the first pre-signal processing policy.

Similarly, a switch K31 in the application layer 601a may be configured to control the voice optimization component 63a shown in FIG. 8, and a switch K32 in the application layer may be configured to control the voice optimization component 63b in the terminal system layer 602a shown in FIG. 8. It can be understood that, because the voice optimization component 63a in the application layer 601a shown in FIG. 8 and the voice optimization component 63b in the terminal system layer 602a shown in FIG. 8 have the same optimization function, the target user terminal may select, according to a collaboration mechanism (which may also be referred to as a negotiation mechanism) between the application layer 601a and the terminal system layer 602a, whether to control turn-on (or turn-off) of the voice optimization component 63b in the second pre-signal processing policy in the terminal system layer 602a in the application layer 601a. For a specific implementation in which the target user terminal may generate a third control instruction used for controlling a service switch 64c to close a switch K31 and open a switch K32, reference may be made to the description about the foregoing first control instruction, and details do not continue to be described again herein. In this case, the target user terminal uses the second optimization component (for example, the voice optimization component 63b in FIG. 8) turned off in the second pre-signal processing policy as a new first collaboration component, and the first optimization component (for example, the voice optimization component 63a shown in FIG. 8) having the same optimization function as that of the new first collaboration component may be turned on in the first pre-signal processing policy.

Operation S103. Obtain uplink voice data of a first user corresponding to the service application in the game voice mode, and perform, based on the first optimization component turned on in the first pre-signal processing policy and the second optimization component turned on in the second pre-signal processing policy, voice optimization on the uplink voice data in the game voice mode.

It is to be understood that, the target user terminal may further perform, based on the first optimization component turned on in the foregoing first pre-signal processing policy and the second optimization component turned on in the foregoing second pre-signal processing policy, voice optimization on the uplink voice data of the first use collected in real timer in the game scenario, so as to ensure clarity and loudness of the uplink voice data currently recorded into the target user terminal. In this way, when the target user terminal is in the game voice mode, the sound of the first user with relatively high clarity and loudness may be transferred to a communication peer end (that is, a terminal corresponding to the foregoing third user). In this way, downlink voice data played by the speaker of the communication peer end may be the voice-optimized sound of the first user.

In an example embodiment of the disclosure, a computer device (for example, the target user terminal used as a mobile terminal) may obtain, in a game voice mode, a signal processing result associated with a first pre-signal processing policy in an application layer of a service application. It can be understood that, each first optimization component in the first pre-signal processing policy and a corresponding second optimization component in the second pre-signal processing policy have the same optimization function. Therefore, in the subsequent real-time voice human sound processing process of the game (that is, voice optimization of uplink voice data), the phenomenon that voice optimization components having the same function are repeatedly run may be effectively eliminated in the game voice mode. For example, an example embodiment of the disclosure discloses that turn-on or turn-off of one or more second optimization components in the terminal system layer may be controlled in the application layer according to the foregoing signal processing result (that is, algorithm comparison results corresponding to voice optimization components having the same function), so that the voice optimization components having the same function may be either run in the application layer of the game or the terminal system layer. In this way, sound quality loss of the uplink voice data may be reduced from the source. It can be understood that, the quantity and type of second optimization components turned on or turned off in the terminal system layer are not limited herein. Further, when obtaining the uplink voice data of the first user in the game voice mode, the computer device may quickly perform voice optimization on the collected uplink voice data collaboratively based on the turned-on first optimization component and the turned-on second optimization component, and then may improve the voice optimization effect in the game scenario while reducing the sound quality loss.

Figure 9:
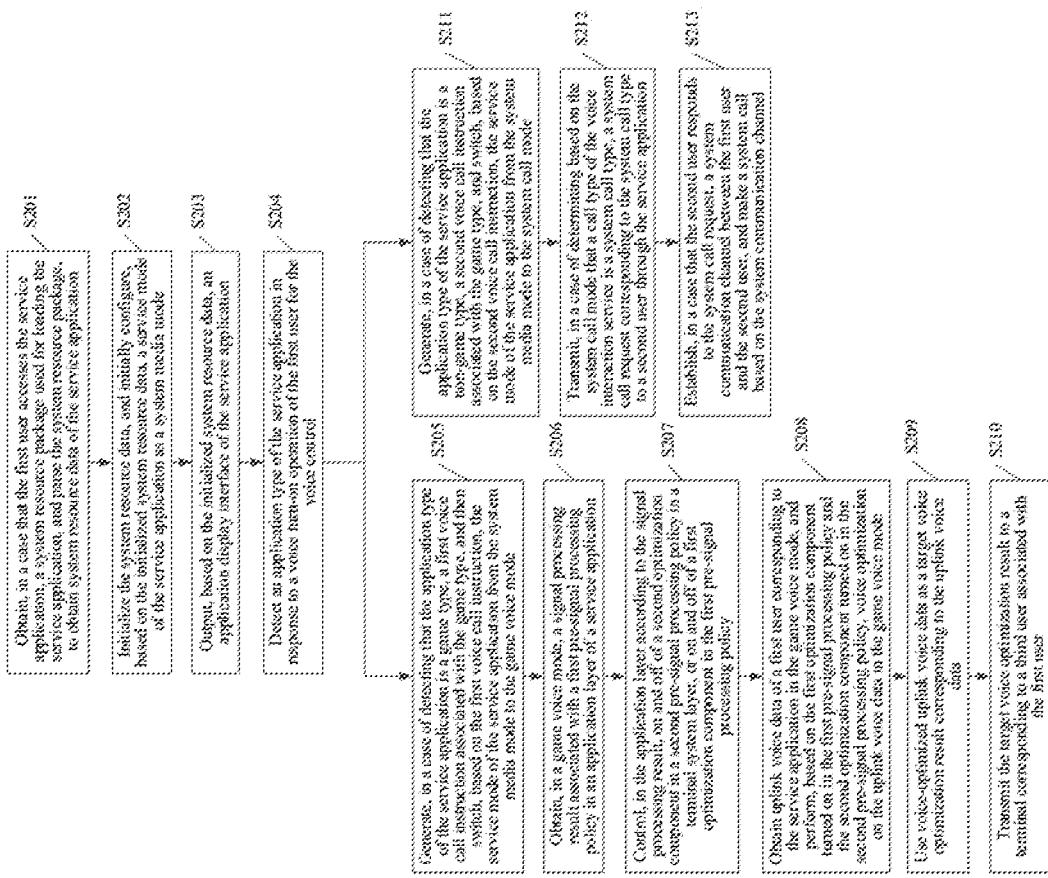
FIG. 9 is a schematic diagram of an audio data processing method according to an example embodiment of the disclosure.

FIG. 9 is a schematic diagram of an audio data processing method according to an embodiment of the disclosure. As shown in FIG. 9, the method may be performed by a user terminal (for example, a target user terminal, the target user terminal may be the foregoing user terminal 3000a shown in FIG. 1), and the method may specifically include at least one of the following operations S201 to S213:

Operation S201. Obtain, in a case that the first user accesses the service application, a system resource package used for loading the service application, and parse the system resource package, to obtain system resource data of the service application.

Operation S202. Initialize the system resource data, and initially configure, based on the initialized system resource data, a service mode of the service application as a system media mode.

Figure 10:
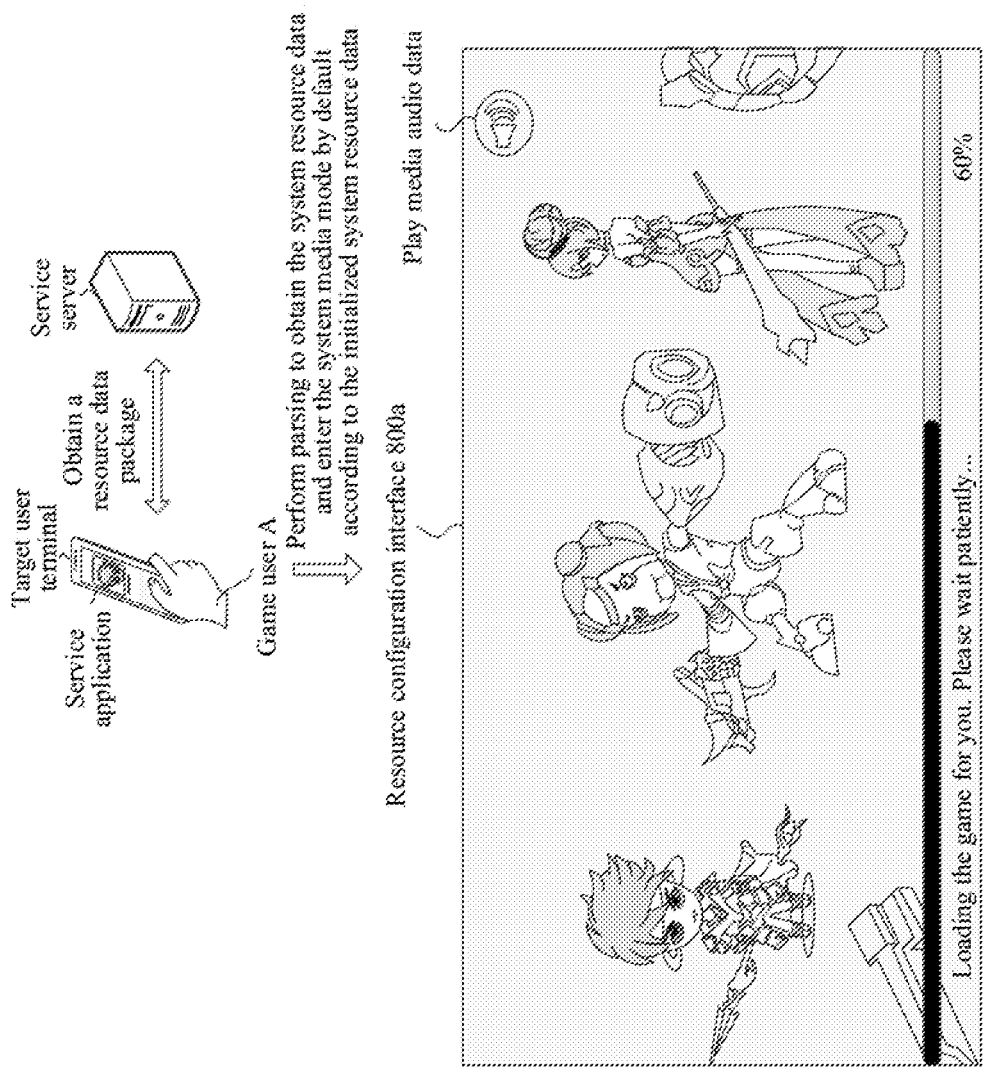
FIG. 10 is a schematic diagram of a scenario of a resource configuration interface according to an example embodiment of the disclosure.

For ease of understanding, FIG. 10 is a schematic diagram of a scenario of a resource configuration interface according to an embodiment of the disclosure. It can be understood that, in a game scenario, a game user A shown in FIG. 10 may be the user 1 in the foregoing embodiment corresponding to FIG. 4.

As shown in FIG. 10, when the game user A starts a service application shown in FIG. 10 in a target user terminal, a system resource package used for loading the service application may be obtained from a service server shown in FIG. 10, and then the obtained system resource package may be parsed through an encoder in the target user terminal, so as to obtain system resource data of the service application. Further, the target user terminal may be further used for initializing the system resource data, and then a resource configuration interface in FIG. 10 may be outputted based on the initialized system resource data. As shown in FIG. 10, the resource configuration interface may be used for dynamically outputting multimedia data in the initialized system resource data, and the multimedia data may include but not limited to an image frame and an audio frame shown in FIG. 10. It can be understood that, in an example embodiment of the disclosure, a service mode of the service application may be initially configured as the system media mode based on the initialized system resource data, so that medium audio data (that is, the foregoing audio frame data and video frame data) shown in FIG. 10 may be played in the resource configuration interface shown in FIG. 10 through a speaker. It can be understood that, after completing the system configuration, the target user terminal may further perform the following operation S103, and then may switch a display interface of the service application from a resource configuration interface 800a shown in FIG. 10 to an application display interface including a voice control. In this way, when the game user A triggers the voice control in a turned-off state in the application display interface, the service mode of the service application may be switched from the current system media mode to the foregoing game voice mode, so as to perform voice interaction in the game voice mode.

Operation S203. Output, based on the initialized system resource data, an application display interface of the service application.

The application display interface includes a voice control used for indicating that the first user initiates a voice interaction service.

Operation S204. Detect an application type of the service application in response to a voice turn-on operation of the first user for the voice control.

Operation S205. Generate, in a case of detecting that the application type of the service application is a game type, a first voice call instruction associated with the game type, and then switch, based on the first voice call instruction, the service mode of the service application from the system media mode to the game voice mode.

Optionally, after performing the foregoing operation S204, the target user terminal may further directly switch, in a case of detecting that the application type of the service application is a game type, the service mode of the service application from the system media mode to the game voice mode.

Operation S206. Obtain, in a game voice mode, a signal processing result associated with a first pre-signal processing policy in an application layer of a service application.

Operation S207. Control, in the application layer according to the signal processing result, on and off of a second optimization component in a second pre-signal processing policy in a terminal system layer, or on and off of a first optimization component in the first pre-signal processing policy.

It is to be understood that, for a specific implementation in which the target user terminal controls turn-on and turn-off of the first optimization component in the first pre-signal processing policy according to an algorithm comparison result in the application layer, reference may be made to the description about the specific process of controlling turn-on and turn-off of the second optimization component in the second pre-signal processing policy in the terminal system layer in the foregoing embodiment corresponding to FIG. 5, and details do not continue to be described again herein.

Operation S208. Obtain uplink voice data of a first user corresponding to the service application in the game voice mode, and perform, based on the first optimization component turned on in the first pre-signal processing policy and the second optimization component turned on in the second pre-signal processing policy, voice optimization on the uplink voice data in the game voice mode.

For the specific implementation of operation S205 to operation S208, reference may be made to the description about operation S101 to operation S103 in the embodiment corresponding to FIG. 5, and details are not described herein again.

Operation S209. Use voice-optimized uplink voice data as a target voice optimization result corresponding to the uplink voice data.

Operation S210. Transmit the target voice optimization result to a terminal corresponding to a third user associated with the first user, to cause the terminal corresponding to the third user to play the voice-optimized uplink voice data through a speaker in the game voice mode.

Optionally, the first user and the third user are game users in the same game camp in the game voice mode.

Optionally, it can be understood that, after performing the foregoing operation S204, in a case that the target user terminal detects that the application type of the currently running service application belongs to a non-game type, the computer device may further jump to perform the following operation S211 to operation S213, so as to enable the foregoing first user to make a system call to another user (for example, the second user) in the system call mode.

Operation S211. Generate, in a case of detecting that the application type of the service application is a non-game type, a second voice call instruction associated with the game type, and switch, based on the second voice call instruction, the service mode of the service application from the system media mode to the system call mode.

Operation S212. Transmit, in a case of determining based on the system call mode that a call type of the voice interaction service is a system call type, a system call request corresponding to the system call type to a second user through the service application.

The second user is a user requesting to make a system call and selected by the first user in the service application.

Operation S213. Establish, in a case that the second user responds to the system call request, a system communication channel between the first user and the second user, and make a system call based on the system communication channel.

Figure 11:
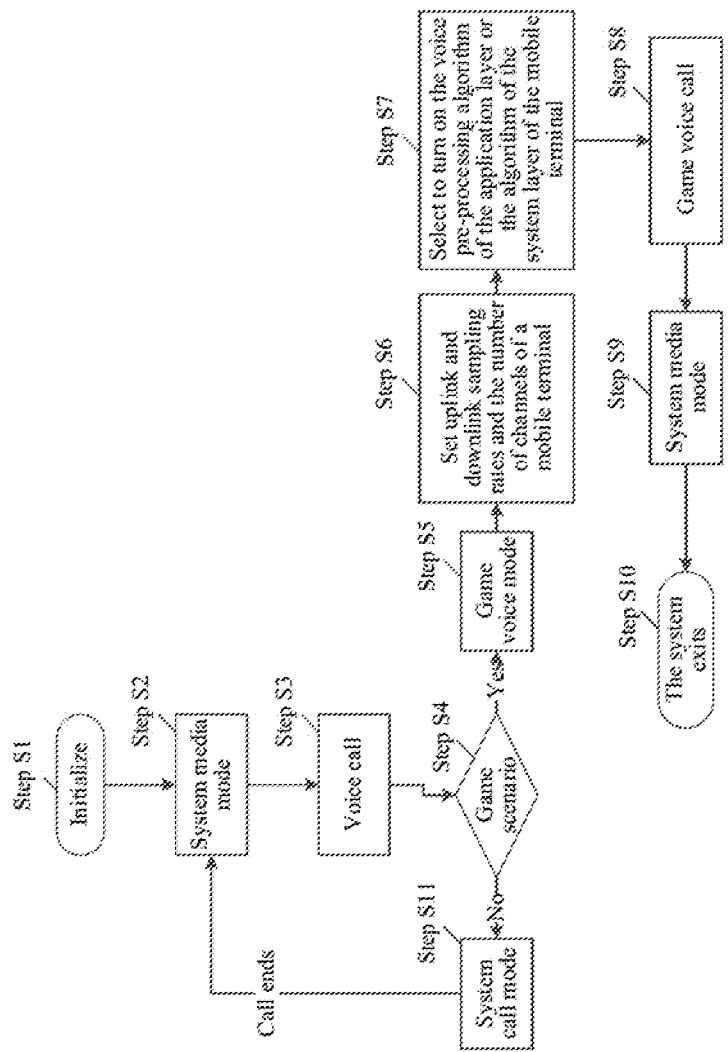
FIG. 11 is a schematic flowchart of a double-talk service used for providing different types of languages according to an example embodiment of the disclosure.

For ease of understanding, further, FIG. 11 is a schematic flowchart of a double-talk service used for providing different types of languages according to an embodiment of the disclosure. As shown in FIG. 11, after starting the foregoing service application in the target user terminal, the first user may perform operation S1 shown in FIG. 11, so as to perform system resource initialization. For example, the target user terminal may initialize the foregoing system resource data obtained by parsing, and then may perform operation S2 shown in FIG. 11 according to the initialized system resource data, so that the target user terminal enters the system media mode by default. Specifically, the target user terminal may initially configure the service mode of the service application as the system media mode. Further, when the first user needs to perform voice interaction with another user, the first user may perform operation S3 shown in FIG. 11, so as to initiate a voice call in the application layer of the target user terminal. In this case, the target user terminal may perform operation S4 shown in FIG. 11, so as to determine the application type of the service application initiating the voice call, and in a case that the application type of the service application is a game type, may perform operation S5 shown in FIG. 11, so as to enter the game voice mode, that is, the first user may perform a voice call in the game scenario with another user (for example, the foregoing third user) in the system call mode. Otherwise, as shown in FIG. 11, the target user terminal may perform operation S11 shown in FIG. 11, so as to enter the system call mode, that is, the first user may perform a system call in the non-game scenario with another user (for example, the foregoing second user) in the system call mode.

As shown in FIG. 11, after performing operation S5, the target user terminal may further perform operation S6, so as to set a voice sampling rate (for example, set uplink and downlink sampling rates shown in FIG. 11, so as to ensure the sampling rate) and the number of sound channels (to ensure uplink and downlink voice quality) of the terminal in the target user terminal, and the voice sampling rate and the number of sound channels may be the foregoing sound quality parameters. Further, as shown in FIG. 11, the target user terminal may further perform operation S7, that is, the target user terminal may turn on the voice pre-signal processing algorithm of the application layer and turn off the pre-signal processing algorithm of the terminal system layer according to the foregoing algorithm comparison effect. Optionally, the target user terminal may alternatively turn off the voice pre-signal processing algorithm of the application layer while turning on the pre-signal processing algorithm of the terminal system layer. In this way, it may be ensured that the voice optimization components having the same optimization function in the target user terminal either work in the application layer, or work in the terminal system layer. That is, in an example embodiment of the disclosure, it may be ensured as much as possible that a voice processing algorithm of only one voice optimization component of the first optimization component of the application layer and the second optimization component having the same optimization function of the terminal system layer is working at one moment. In this way, power consumption may be maximally reduced, and an optimal voice sound quality effect may be provided.

Further, as shown in FIG. 11, when performing operation S8 shown in FIG. 11 with another user in the game scenario, the first user may perform an inter-end game voice call in the game voice scenario. That is, during a game voice call, the target user terminal may optimize, through the foregoing negotiated and determined first optimization component and second optimization component, the uplink voice data of the first user collected in real time, and then may transmit the optimized sound of the first user to the another user. Further, it can be understood that, when the first user does not need to transmit the optimized voice to another game user in the same camp, the first user may perform operation S9 shown in FIG. 11 in the game scenario. For example, the target user terminal may respond to the voice turn-off operation of the first user for the foregoing voice control, and then may switch the service mode of the service application from the foregoing game voice mode back to the system media mode shown in FIG. 11. It is to be understood that, in an example embodiment of the disclosure, an optimized sound of another user transmitted by a terminal corresponding to the another user may be further played through the system media mode in the game scenario. For example, the first user corresponding to the target user terminal may hear the optimized sound of the another user (that is, the foregoing third user) in the system media mode. In this case, in a case that the voice control is turned off, the first user does not need to continue to perform voice optimization on the uplink voice data of the first user. That is, in this case, the first user does not need to transmit the optimized sound of the first user to another user in the game scenario.

It is to be understood that, as shown in FIG. 11, after running the game in the foregoing service application, the first user may perform operation S10 shown in FIG. 11, so as to exit the current game system. In this case, the target user terminal may release related system resource data.

It can be understood that, when the first user is listening to music in the target user terminal, the target user terminal may work in the foregoing system media mode; and when the first user is making a phone call in the target user terminal, the target user terminal may work in the foregoing system call mode. Optionally, when the first user is performing game voice in the target user terminal, the target user terminal may work in the foregoing game voice mode. It is to be understood that, the voice interaction system involved in an example embodiment of the disclosure may include the following two modules, where one module is the game voice mode in the target user terminal, and may exist in the target user terminal in parallel to the system call mode and the system media mode. It can be understood that, in the game voice mode, the uplink and downlink voice sampling rates and the number of channels configured based on the sound quality index of the target user terminal do not affect each other. The other module is the pre-signal processing solution run in the application layer. For example, the target user terminal may intelligently adjust the pre-signal processing solution of the application layer according to a voice processing effect of the terminal system layer. In this way, through collaborative working of the two modules, the target user terminal can improve experience of voice interaction between game users in the game scenario.

In an example embodiment of the disclosure, in a case of detecting that the application type of the service application is the game type, the computer device (for example, the target user terminal) enters the game voice mode, and then may adaptively control, in the game voice mode, turn-on or turn-off of one or more second optimization components in the terminal system layer in the application layer according to the foregoing signal processing result (that is, algorithm comparison results corresponding to voice optimization components having the same function), so that the voice optimization components having the same optimization function may be either run in the application layer of the game or the terminal system layer. In this way, sound quality loss of the uplink voice data may be reduced from the source. It can be understood that, the quantity and type of second optimization components turned on or turned off in the terminal system layer are not limited herein. Further, when obtaining the uplink voice data of the first user in the game voice mode, the computer device (for example, the target user terminal) may further quickly perform voice optimization on the uplink voice data in the game voice mode based on the turned-on first optimization component and the turned-on second optimization component, and then may improve the voice optimization effect in the game scenario while reducing the sound quality loss. Optionally, in an example embodiment of the disclosure, in a case of detecting that the application type of the service application is the non-game type, the target user terminal may alternatively enter the system voice mode, and then the first user may make a system call to another user in the system voice mode.

Figure 12:
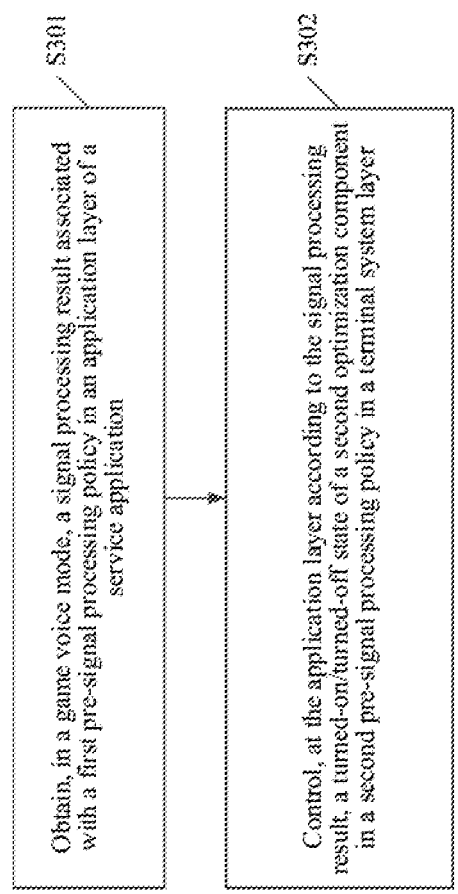
FIG. 12 is a schematic flowchart of another audio data processing method according to an example embodiment of the disclosure.

FIG. 12 is a schematic flowchart of another audio data processing method according to an embodiment of the disclosure. The method is performed by a computer device. For example, the method may be performed by a user terminal (for example, the foregoing target user terminal, the target user terminal may be the user terminal 10a in the foregoing embodiment corresponding to FIG. 4), or may be performed by a service server (for example, the foregoing service server 2000 shown in FIG. 1), or may be performed by a user terminal and a service server interactively and collaboratively. For ease of understanding, an example embodiment is described by using an example in which the method is performed by the user terminal. The audio data processing method may include at least one operation of the following operation S301 to operation S302:

Operation S301. Obtain, in a game voice mode, a signal processing result associated with a first pre-signal processing policy in an application layer of a service application.

Operation S302. Control, at the application layer according to the signal processing result, a turned-on/turned-off state of a second optimization component in a second pre-signal processing policy in a terminal system layer.

The first pre-signal processing policy includes at least one first optimization component, and the second pre-signal processing policy includes at least one second optimization component.

For example, a second optimization component needing to be turned on in the second pre-signal processing policy in the terminal system layer is determined at the application layer according to the signal processing result, and/or a second optimization component needing to be turned off in the second pre-signal processing policy in the terminal system layer is determined at the application layer according to the signal processing result, Then, for the second optimization component needing to be turned on in the second pre-signal processing policy, in a case that the current state of the second optimization component is the turned-off state, the application layer controls the second optimization component to be turned on, and in a case that the current state of the second optimization component is the turned-on state, the second optimization component is kept on; and for the second optimization component needing to be turned off in the second pre-signal processing policy, in a case that the current state of the second optimization component is the turned-on state, the application layer controls the second optimization component to be turned off, and in a case that the current state of the second optimization component is the turned-off state, the second optimization component is kept off.

Optionally, a turned-on/turned-off state of the first optimization component in the first pre-signal processing policy is controlled at the application layer according to the signal processing result.

In an example embodiment, the foregoing operation S302 includes: determining, according to the signal processing result, the second optimization component turned on in the second pre-signal processing policy, and a second optimization component turned off in the second pre-signal processing policy; using, in the application layer, the second optimization component turned off in the second pre-signal processing policy as a first collaboration component, and turning on, in the first pre-signal processing policy, a first optimization component having the same optimization function as that of the first collaboration component; and using, in the application layer, the second optimization component turned on in the second pre-signal processing policy as a second collaboration component, and turning off, in the first pre-signal processing policy, a first optimization component having the same optimization function as that of the second collaboration component.

In an example embodiment, the foregoing operation S301 includes: obtaining a terminal type of a terminal to which the service application belongs, and searching a test list associated with the service application for a test type matching the terminal type; obtaining, from the test list and based on the sound quality parameter in a case that a test type matching the terminal type is found by searching the test list, a first test processing result obtained by using the first pre-signal processing policy and a second test processing result obtained by using the second pre-signal processing policy; and determining, based on the first test processing result and the second test processing result, an optimal signal processing policy associated with the sound quality parameter from the first pre-signal processing policy and the second pre-signal processing policy, and using the optimal signal processing policy as the signal processing result associated with the first pre-signal processing policy.

Optionally, in a case that no test type matching the terminal type is found by searching the test list, performing, in a case that the uplink voice data of the first user obtained through a microphone in the game voice mode, voice optimization on the uplink voice data through the first pre-signal processing policy, to obtain a first voice optimization result, and voice optimization on the uplink voice data through the second pre-signal processing policy, to obtain a second voice optimization result; and determining, based on the first voice optimization result and the second voice optimization result, an optimal signal processing policy associated with the sound quality parameter from the first pre-signal processing policy and the second pre-signal processing policy, and using the optimal signal processing policy as the signal processing result associated with the first pre-signal processing policy.

In an example embodiment, the foregoing method further includes: obtaining uplink voice data of a first user corresponding to the service application in the game voice mode, and performing, based on the first optimization component turned on in the first pre-signal processing policy and the second optimization component turned on in the second pre-signal processing policy, voice optimization on the uplink voice data in the game voice mode.

In an example embodiment, the foregoing method further includes: obtaining, in a case that the first user accesses the service application, a system resource package used for loading the service application, and parsing the system resource package, to obtain system resource data of the service application; and initializing the system resource data, and initially configuring, based on the initialized system resource data, a service mode of the service application as a system media mode.

In an example embodiment, the foregoing method further includes: using voice-optimized uplink voice data as a target voice optimization result corresponding to the uplink voice data; and transmitting the target voice optimization result to a terminal corresponding to a third user associated with the first user, to cause the terminal corresponding to the third user to play the voice-optimized uplink voice data through a speaker in the game voice mode.

In an example embodiment of the disclosure, the game voice mode is provided. In the mode, the application layer of the service application has permission to control a turned-on/turned-off state of a voice optimization component in the terminal system layer, so that the service application can flexibly control the turned-on/turned-off state of the voice optimization component in the terminal system layer according to an actual service request or requirement, to ensure a voice optimization effect in the mode.

Figure 13:
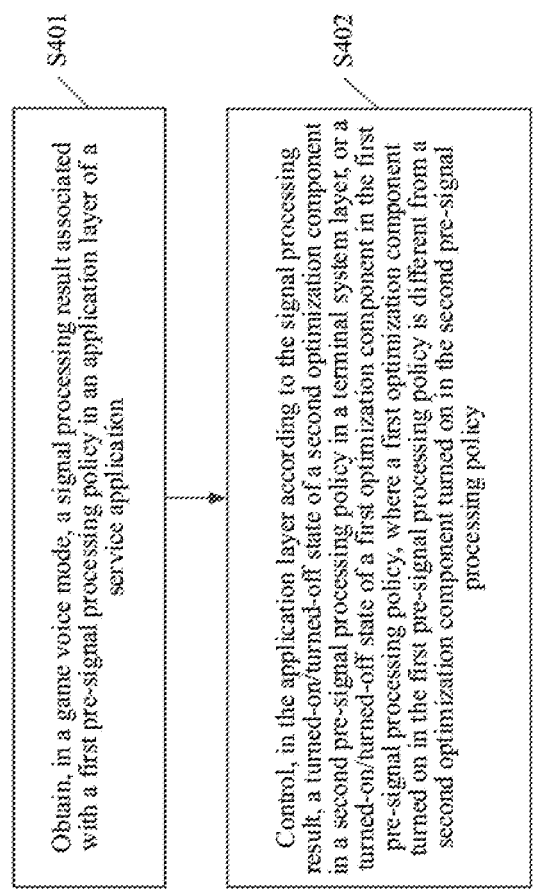
FIG. 13 is a schematic flowchart of another audio data processing method according to an example embodiment of the disclosure.

FIG. 13 is a schematic flowchart of another audio data processing method according to an embodiment of the disclosure. The method is performed by a computer device. For example, the method may be performed by a user terminal (for example, the foregoing target user terminal, the target user terminal may be the user terminal 10a in the foregoing embodiment corresponding to FIG. 4), or may be performed by a service server (for example, the foregoing service server 2000 shown in FIG. 1), or may be performed by a user terminal and a service server interactively and collaboratively. For ease of understanding, an example embodiment is described by using an example in which the method is performed by the user terminal. The audio data processing method may include at least one operation of the following operation S401 to operation S402:

Operation S401. Obtain, in a game voice mode, a signal processing result associated with a first pre-signal processing policy in an application layer of a service application.

Operation S402. Control, according to the signal processing result, a turned-on/turned-off state of a second optimization component in a second pre-signal processing policy in a terminal system layer, or a turned-on/turned-off state of a first optimization component in the first pre-signal processing policy, a first optimization component turned on in the first pre-signal processing policy being different from a second optimization component turned on in the second pre-signal processing policy.

The first pre-signal processing policy includes at least one first optimization component, and the second pre-signal processing policy includes at least one second optimization component.

Optionally, the first optimization component turned on in the first pre-signal processing policy and the voice optimization component turned off in the second pre-signal processing policy have the same optimization function, and the second optimization component turned on in the second pre-signal processing policy and the first optimization component turned off in the first pre-signal processing policy have the same optimization function.

Optionally, operation S402 may be performed by the application layer of the service application, or may be performed by the terminal system layer, or performed by the application layer and the terminal system layer collaboratively. For example, the application layer controls the turned-on/turned-off state of the first optimization component in the first pre-signal processing policy, and the terminal system layer controls the turned-on/turned-off state of the second optimization component in the second pre-signal processing policy. In this case, between the application layer and the terminal system layer, the signal processing result needs to be synchronized or the first optimization components and/or the second optimization components needing to be turned on and turned off are synchronized.

In an example embodiment, the foregoing operation S402 includes: determining, according to the signal processing result, the second optimization component turned on in the second pre-signal processing policy, and a second optimization component turned off in the second pre-signal processing policy; turning off the second optimization component turned off in the second pre-signal processing policy, and turning on, in the first pre-signal processing policy, a first optimization component having the same optimization function as that of the turned-off second optimization component; and turning on the second optimization component turned on in the second pre-signal processing policy, and turning off, in the first pre-signal processing policy, a first optimization component having the same optimization function as that of the turned-on second optimization component. Optionally, for the second optimization component needing to be turned on in the second pre-signal processing policy, in a case that the current state of the second optimization component is the turned-off state, the second optimization component is controlled to be turned on, and in a case that the current state of the second optimization component is the turned-on state, the second optimization component is kept on; and for the second optimization component needing to be turned off in the second pre-signal processing policy, in a case that the current state of the second optimization component is the turned-on state, the second optimization component is controlled to be turned off, and in a case that the current state of the second optimization component is the turned-off state, the second optimization component is kept off.

In an example embodiment, the foregoing operation S401 includes: obtaining a terminal type of a terminal to which the service application belongs, and searching a test list associated with the service application for a test type matching the terminal type; obtaining, from the test list and based on the sound quality parameter in a case that a test type matching the terminal type is found by searching the test list, a first test processing result obtained by using the first pre-signal processing policy and a second test processing result obtained by using the second pre-signal processing policy; and determining, based on the first test processing result and the second test processing result, an optimal signal processing policy associated with the sound quality parameter from the first pre-signal processing policy and the second pre-signal processing policy, and using the optimal signal processing policy as the signal processing result associated with the first pre-signal processing policy.

Optionally, in a case that no test type matching the terminal type is found by searching the test list, performing, in a case that the uplink voice data of the first user obtained through a microphone in the game voice mode, voice optimization on the uplink voice data through the first pre-signal processing policy, to obtain a first voice optimization result, and voice optimization on the uplink voice data through the second pre-signal processing policy, to obtain a second voice optimization result; and determining, based on the first voice optimization result and the second voice optimization result, an optimal signal processing policy associated with the sound quality parameter from the first pre-signal processing policy and the second pre-signal processing policy, and using the optimal signal processing policy as the signal processing result associated with the first pre-signal processing policy.

In an example embodiment, the foregoing method further includes: obtaining, in a case that the first user accesses the service application, a system resource package used for loading the service application, and parsing the system resource package, to obtain system resource data of the service application; and initializing the system resource data, and initially configuring, based on the initialized system resource data, a service mode of the service application as a system media mode.

Optionally, after the foregoing operation S402, the method further includes: obtaining uplink voice data of a first user corresponding to the service application in the game voice mode, and performing, based on the first optimization component turned on in the first pre-signal processing policy and the second optimization component turned on in the second pre-signal processing policy, voice optimization on the uplink voice data in the game voice mode.

In an example embodiment of the disclosure, turn-on or turn-off of one or more voice optimization components in the terminal system layer is controlled according to the foregoing signal processing result, so that the voice optimization components having the same optimization function may be either run in the application layer or the terminal system layer. In this way, sound quality loss of the uplink voice data may be reduced from the source, to improve the voice optimization effect in the game scenario.

Additionally, for details not described in an example embodiment of FIG. 12 and FIG. 13, reference may be made to the descriptions of the related content in other embodiments of the disclosure, and details are not described herein again.

Figure 14:
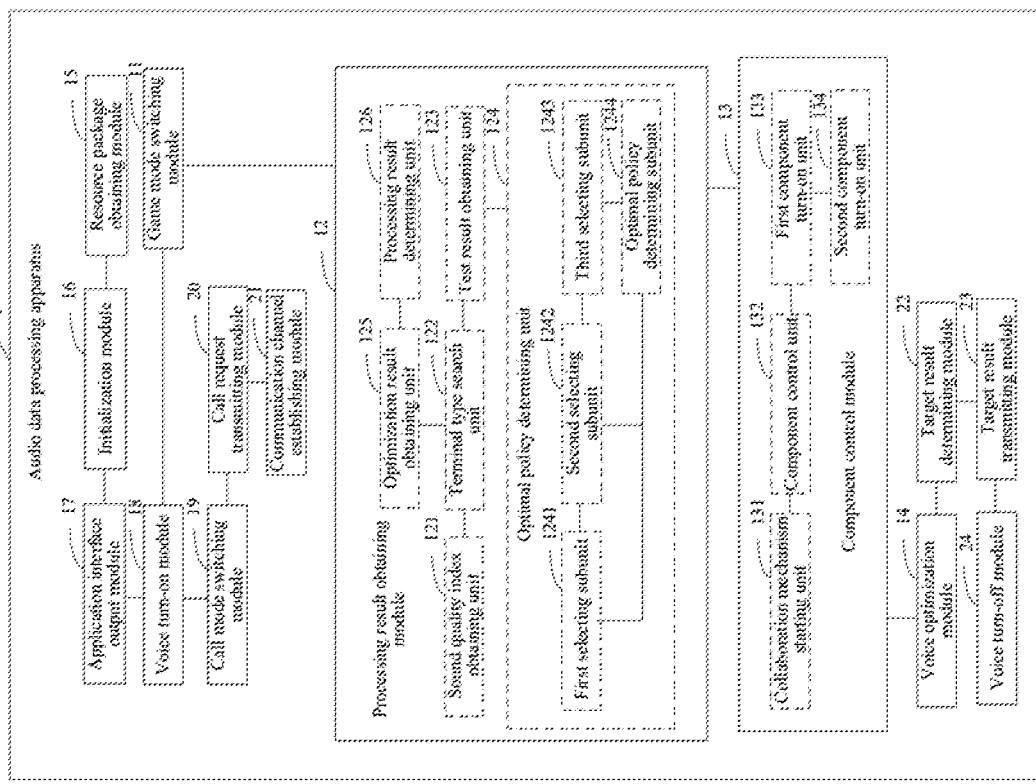
FIG. 14 is a schematic structural diagram of an audio data processing apparatus according to an example embodiment of the disclosure.

FIG. 14 is a schematic structural diagram of an audio data processing apparatus according to an embodiment of the disclosure. The audio data processing apparatus 1 may include at least one of the following: a processing result obtaining module 12, a component control module 13 and a voice optimization module 14. Optionally, the audio data processing apparatus may further include at least one of the following: a resource package obtaining module 15, an initialization module 16, an application interface output module 17, a voice turn-on module 18, a game mode switching module 11, a call mode switching module 19, a call request transmitting module 20, a communication channel establishing module 21, a target result determining module 22, a target result transmitting module 23, and a voice turn-off module 24.

The processing result obtaining module 12 is configured to obtain, in a game voice mode, a signal processing result associated with a first pre-signal processing policy in an application layer of a service application, the first pre-signal processing policy including at least one first optimization component.

The processing result obtaining module 12 includes: a sound quality index obtaining unit 121, a terminal type search unit 122, a test result obtaining unit 123, an optimal policy determining unit 124, an optimization result obtaining unit 125 and a processing result determining unit 126.

The sound quality index obtaining unit 121 is configured to obtain a sound quality index of the service application in the game voice mode, and configure a sound quality parameter of the service application according to the sound quality index of the service application.

The terminal type search unit 122 is configured to obtain a terminal type of a terminal to which the service application belongs, and search a test list associated with the service application for a test type matching the terminal type.

The test result obtaining unit 123 is configured to obtain, from the test list and based on the sound quality parameter in a case that a test type matching the terminal type is found by searching the test list, a first test processing result obtained by using the first pre-signal processing policy and a second test processing result obtained by using the second pre-signal processing policy. The first pre-signal processing policy is a pre-signal processing policy in the application layer of the service application. The second pre-signal processing policy is a pre-signal processing policy in a terminal system layer corresponding to a test terminal type.

The optimal policy determining unit 124 is configured to determine, based on the first test processing result and the second test processing result, an optimal signal processing policy associated with the sound quality parameter from the first pre-signal processing policy and the second pre-signal processing policy, and use the determined optimal signal processing policy as the signal processing result associated with the first pre-signal processing policy.

The first optimization component in the first pre-signal processing policy includes at least one of the following voice optimization algorithms: a first acoustic echo cancellation algorithm used for performing acoustic echo cancellation in the application layer, a first noise suppression algorithm used for performing noise suppression in the application layer, and a first gain control algorithm used for performing gain adjustment in the application layer; and the second optimization component in the second pre-signal processing policy includes at least one of the following voice optimization algorithms: a second acoustic echo cancellation algorithm used for performing acoustic echo cancellation in the terminal system layer, a second noise suppression algorithm used for performing noise suppression in the terminal system layer, and a second gain control algorithm used for performing gain adjustment in the terminal system layer.

The optimal policy determining unit 124 includes: a first selecting subunit 1241, a second selecting subunit 1242, a third selecting subunit 1243 and an optimal policy determining subunit 1244.

The first selecting subunit 1241 is configured to obtain a first acoustic echo cancellation result corresponding to the first acoustic echo cancellation algorithm from the first test processing result, obtain a second acoustic echo cancellation result corresponding to the second acoustic echo cancellation algorithm from the second test processing result, select, based on the first acoustic echo cancellation result and the second acoustic echo cancellation result, an optimal acoustic echo cancellation algorithm from the first acoustic echo cancellation algorithm and the second acoustic echo cancellation algorithm, and use the optimal acoustic echo cancellation algorithm as a first optimal signal processing policy associated with the sound quality parameter.

The first selecting subunit 1241 is further configured to obtain the first acoustic echo cancellation result corresponding to the first acoustic echo cancellation algorithm from the first test processing result, and obtain the second acoustic echo cancellation result corresponding to the second acoustic echo cancellation algorithm from the second test processing result.

The first selecting subunit 1241 is further configured to perform a first comparison between optimization quality corresponding to the first acoustic echo cancellation result and optimization quality corresponding to the second acoustic echo cancellation result, to obtain a first comparison result.

The first selecting subunit 1241 is further configured to use, in a case that the first comparison result indicates that the optimization quality corresponding to the first acoustic echo cancellation result is better than the optimization quality corresponding to the second acoustic echo cancellation result, the first acoustic echo cancellation algorithm in the first pre-signal processing policy as the first optimal signal processing policy associated with the sound quality parameter.

Optionally, the first selecting subunit 1241 is further configured to use, in a case that the first comparison result indicates that the optimization quality corresponding to the second acoustic echo cancellation result is better than the optimization quality corresponding to the first acoustic echo cancellation result, the second acoustic echo cancellation algorithm in the second pre-signal processing policy as the first optimal signal processing policy associated with the sound quality parameter.

The second selecting subunit 1242 is configured to obtain a first noise suppression result corresponding to the first noise suppression algorithm from the first test processing result, obtain a second noise suppression result corresponding to the second noise suppression algorithm from the second test processing result, select, based on the first noise suppression result and the second noise suppression result, an optimal noise suppression algorithm from the first noise suppression algorithm and the second noise suppression algorithm, and use the optimal noise suppression algorithm as a second optimal signal processing policy associated with the sound quality parameter.

The second selecting subunit 1242 is further configured to obtain the first noise suppression result corresponding to the first noise suppression algorithm from the first test processing result, and obtain the second noise suppression result corresponding to the second noise suppression algorithm from the second test processing result.

The second selecting subunit 1242 is further configured to perform a second comparison between optimization quality corresponding to the first noise suppression result and optimization quality corresponding to the second noise suppression result, to obtain a second comparison result.

The second selecting subunit 1242 is further configured to use, in a case that the second comparison result indicates that the optimization quality corresponding to the first noise suppression result is better than the optimization quality corresponding to the second noise suppression result, the first noise suppression algorithm in the first pre-signal processing policy as the second optimal signal processing policy associated with the sound quality parameter.

Optionally, the second selecting subunit 1242 is further configured to use, in a case that the second comparison result indicates that the optimization quality corresponding to the second noise suppression result is better than the optimization quality corresponding to the first noise suppression result, the second noise suppression algorithm in the second pre-signal processing policy as the second optimal signal processing policy associated with the sound quality parameter.

The third selecting subunit 1243 is configured to obtain a first gain control result corresponding to the first gain control algorithm from the first test processing result, obtain a second gain control result corresponding to the second gain control algorithm from the second test processing result, select, based on the first gain control result and the second gain control result, an optimal gain control algorithm from the first gain control algorithm and the second gain control algorithm, and use the optimal gain control algorithm as a third optimal signal processing policy associated with the sound quality parameter.

The third selecting subunit 1243 is further configured to obtain the first gain control result corresponding to the first gain control algorithm from the first test processing result, and obtain the second gain control result corresponding to the second gain control algorithm from the second test processing result.

The third selecting subunit 1243 is further configured to perform a third comparison between optimization quality corresponding to the first gain control result and optimization quality corresponding to the second gain control result, to obtain a third comparison result.

The third selecting subunit 1243 is further configured to use, in a case that the third comparison result indicates that the optimization quality corresponding to the first gain control result is better than the optimization quality corresponding to the second gain control result, the first gain control algorithm in the first pre-signal processing policy as the third optimal signal processing policy associated with the sound quality parameter.

Optionally, the third selecting subunit 1243 is further configured to use, in a case that the third comparison result indicates that the optimization quality corresponding to the second gain control result is better than the optimization quality corresponding to the first gain control result, the second gain control algorithm in the second pre-signal processing policy as the third optimal signal processing policy associated with the sound quality parameter.

The optimal policy determining subunit 1244 is configured to determine the first optimal signal processing policy, the second optimal signal processing policy, and the third optimal signal processing policy as the signal processing result associated with the first pre-signal processing policy.

For specific implementations of the first selecting subunit 1241, the second selecting subunit 1242, the third selecting subunit 1243 and the optimal policy determining subunit 1244, reference may be made to the description about the foregoing specific implementation of determining the signal processing result, and details do not continue to be described again herein.

Optionally, the optimization result obtaining unit 125 is configured to, in a case that no test type matching the terminal type is found by searching the test list, perform, in a case that the uplink voice data of the first user obtained through a microphone in the game voice mode, voice optimization on the uplink voice data through the first pre-signal processing policy, to obtain a first voice optimization result, and voice optimization on the uplink voice data through the second pre-signal processing policy, to obtain a second voice optimization result.

The processing result determining unit 126 is configured to determine, based on the first voice optimization result and the second voice optimization result, an optimal signal processing policy associated with the sound quality parameter from the first pre-signal processing policy and the second pre-signal processing policy, and using the determined optimal signal processing policy as the signal processing result associated with the first pre-signal processing policy.

For specific implementations of the sound quality index obtaining unit 121, the terminal type search unit 122, the test result obtaining unit 123, the optimal policy determining unit 124, the optimization result obtaining unit 125 and the processing result determining unit 126, reference may be made to the description about operation S101 and operation S102 in the foregoing embodiment corresponding to FIG. 5, and details do not continue to be described again herein.

The component control module 13 is configured to control, in the application layer according to the signal processing result, a turned-on/turned-off state of a second optimization component in a second pre-signal processing policy in a terminal system layer, or a turned-on/turned-off state of a first optimization component in the first pre-signal processing policy.

A first optimization component turned on in the first pre-signal processing policy is different from a second optimization component turned on in the second pre-signal processing policy. The first optimization component turned on in the first pre-signal processing policy and the voice optimization component turned off in the second pre-signal processing policy have the same optimization function, and the second optimization component turned on in the second pre-signal processing policy and the first optimization component turned off in the first pre-signal processing policy have the same optimization function.

The component control module 13 includes: a collaboration mechanism starting unit 131, a component control unit 132, a first component turn-on unit 133 and a second component turn-on unit 134.

The collaboration mechanism starting unit 131 is configured to start, according to the signal processing result, a collaboration mechanism between the application layer and the terminal system layer of the terminal to which the service application belongs.

The component control unit 132 is configured to control, in the application layer based on the collaboration mechanism, turn-on and turn-off of the second optimization component in the second pre-signal processing policy in the terminal system layer.

The first component turn-on unit 133 is configured to use, in the application layer, the second optimization component turned off in the second pre-signal processing policy as a first collaboration component, and turn on, in the first pre-signal processing policy, a first optimization component having the same optimization function as that of the first collaboration component.

The second component turn-on unit 134 is configured to use, in the application layer, the second optimization component turned on in the second pre-signal processing policy as a second collaboration component, and turn off, in the first pre-signal processing policy, a first optimization component having the same optimization function as that of the second collaboration component.

For the specific implementations of the collaboration mechanism starting unit 131, the component control unit 132, the first component turn-on unit 133 and the second component turn-on unit 134, reference may be made to the description about operation S102 in the embodiment corresponding to FIG. 5, and details are not described herein again.

The voice optimization module 14 is configured to obtain uplink voice data of a first user corresponding to the service application in the game voice mode, and perform, based on the first optimization component turned on in the first pre-signal processing policy and the second optimization component turned on in the second pre-signal processing policy, voice optimization on the uplink voice data in the game voice mode.

The first optimization component in the first pre-signal processing policy includes at least: a first acoustic echo cancellation component, a first noise suppression component, and a first gain control component; the second optimization component in the second pre-signal processing policy includes at least: a second acoustic echo cancellation component, a second noise suppression component, and a second gain control component; the first acoustic echo cancellation component and the second acoustic echo cancellation component are both configured to perform acoustic echo cancellation; the first noise suppression component and the second noise suppression component are both configured to perform noise suppression; and the first gain control component and the second gain control component are both configured to perform gain adjustment.

Optionally, the resource package obtaining module 15 is configured to obtain, in a case that the first user accesses the service application, a system resource package used for loading the service application, and parse the system resource package, to obtain system resource data of the service application; and the initialization module 16 is configured to initialize the system resource data, and initially configure, based on the initialized system resource data, a service mode of the service application as a system media mode.

The application interface output module 17 is configured to output, based on the initialized system resource data, an application display interface of the service application, where the application display interface includes a voice control used for indicating that the first user initiates a voice interaction service; and the voice turn-on module 18 is configured to detect an application type of the service application in response to a voice turn-on operation of the first user for the voice control.

It can be understood that, the voice turn-on module 18 may instruct, in a case of detecting that the application type of the service application is a game type, the game mode switching module 11 to generate, in the case of detecting that the application type of the service application is the game type, a first voice call instruction associated with the game type, and switch, based on the first voice call instruction, the service mode of the service application from the system media mode to the game voice mode.

Optionally, the voice turn-on module 18 may alternatively instruct, in a case of detecting that the application type of the service application is a non-game type (for example, social type), the call mode switching module 19 to generate, in the case of detecting that the application type of the service application is the non-game type, a second voice call instruction associated with the game type, and switch, based on the second voice call instruction, the service mode of the service application from the system media mode to the system call mode.

The call request transmitting module 20 is configured to transmit, in a case of determining based on the system call mode that a call type of the voice interaction service is a system call type, a system call request corresponding to the system call type to a second user through the service application, where the second user is a user requesting to make a system call and selected by the first user in the service application; and the communication channel establishing module 21 is configured to establish, in a case that the second user responds to the system call request, a system communication channel between the first user and the second user, and make a system call based on the system communication channel.

Optionally, the target result determining module 22 is configured to use voice-optimized uplink voice data as a target voice optimization result corresponding to the uplink voice data; and the target result transmitting module 23 is configured to transmit the target voice optimization result to a terminal corresponding to a third user associated with the first user, to cause the terminal corresponding to the third user to play the voice-optimized uplink voice data through a speaker in the game voice mode. Optionally, the first user and the third user are game users in the same game camp in the game voice mode.

Optionally, the voice turn-off module 24 is configured to switch, in response to a voice turn-off operation of the first user for the voice control, the service mode of the service application from the game voice mode back to the system media mode.

For the specific implementation of the processing result obtaining module 12, the component control module 13 and the voice optimization module 14, reference may be made to the description about operation S101 to operation S103 in the embodiment corresponding to FIG. 5, and details are not described herein again. Further, For the specific implementation of the resource package obtaining module 15, the initialization module 16, the application interface output module 17, the voice turn-on module 18, the game mode switching module 11, the call mode switching module 19, the call request transmitting module 20, the communication channel establishing module 21, the target result determining module 22, the target result transmitting module 23, and the voice turn-off module 24, reference may be made to the description about operation S201 to operation S213 in the embodiment corresponding to FIG. 9, and details are not described herein again. In addition, the description of beneficial effects of the same method is not described herein again.

An exemplary embodiment of the disclosure further provides an audio data processing apparatus, the apparatus is configured to perform the method embodiment shown in FIG. 12, and the apparatus may include at least one of the following: a processing result obtaining module and a component control module.

The processing result obtaining module is configured to obtain, in a game voice mode, a signal processing result associated with a first pre-signal processing policy in an application layer of a service application, the first pre-signal processing policy including at least one first optimization component.

The component control module is configured to control, at the application layer according to the signal processing result, a turned-on/turned-off state of a second optimization component in a second pre-signal processing policy in a terminal system layer, the second pre-signal processing policy including at least one second optimization component.

An exemplary embodiment of the disclosure further provides an audio data processing apparatus, the apparatus is configured to perform the method embodiment shown in FIG. 13, and the apparatus may include at least one of the following: a processing result obtaining module and a component control module.

The processing result obtaining module is configured to obtain, in a game voice mode, a signal processing result associated with a first pre-signal processing policy in an application layer of a service application, the first pre-signal processing policy including at least one first optimization component.

The component control module is configured to control, according to the signal processing result, a turned-on/turned-off state of a second optimization component in a second pre-signal processing policy in a terminal system layer, or a turned-on/turned-off state of a first optimization component in the first pre-signal processing policy, a first optimization component turned on in the first pre-signal processing policy being different from a second optimization component turned on in the second pre-signal processing policy.

For details not described in detail in the foregoing apparatus embodiments, reference may be made to the corresponding method embodiments.

Figure 15:
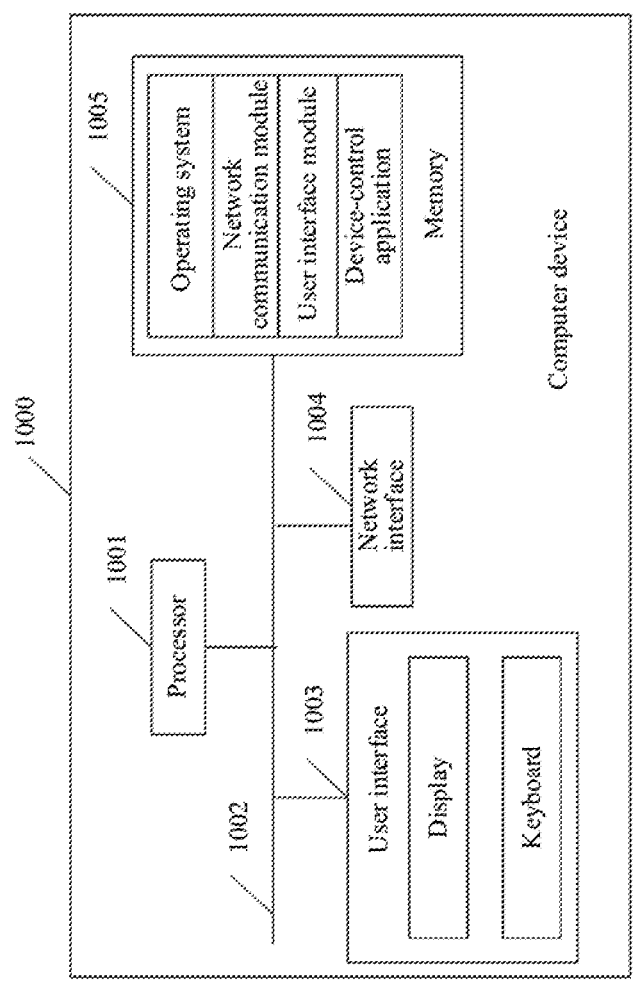
FIG. 15 is a schematic structural diagram of a computer device according to an example embodiment of the disclosure.

Further, FIG. 15 is a schematic structural diagram of a computer device according to an embodiment of the disclosure. As shown in FIG. 15, the computer device 1000 may be a user terminal, and the user terminal may be the foregoing target user terminal. In this case, the computer device 1000 may include: a processor 1001, a network interface 1004 and a memory 1005. Moreover, the computer device 1000 may further include: a user interface 1003 and at least one communication bus 1002. The communication bus 1002 is configured to implement connection and communication between the components. The user interface 1003 may include a display, a keyboard, and an optional user interface 1003 may further include a standard wired interface, wireless interface. Optionally, the network interface 1004 may include a standard wired interface and a standard wireless interface (such as a Wi-Fi interface). The memory 1005 may be a high-speed random access memory (RAM), or may be a non-volatile memory, for example, at least one magnetic disk memory. Optionally, the memory 1005 may be at least one storage apparatus that is located far away from the foregoing processor 1001. As shown in FIG. 15, the memory 1005 used as a computer storage medium may include an operating system, a network communication module, a user interface module, and a device-control application.

The network interface 1004 in the computer device 1000 may further provide a network communication function, and optionally the user interface 1003 may further include a display and a keyboard. In the computer device 1000 shown in FIG. 15, the network interface 1004 may provide a network communication function, the user interface 1003 is mainly configured to provide an input interface for a user, and the processor 1001 may be configured to invoke the device-control application stored in the memory 1005, to perform the description about the audio data processing method in the foregoing embodiment corresponding to FIG. 5 or FIG. 9 or FIG. 12 or FIG. 13 or another method embodiment, or perform the description about the audio data processing apparatus 1 in the foregoing embodiment corresponding to FIG. 14, and details are not described herein again. In addition, the description of beneficial effects of the same method is not described herein again.

Moreover, an example embodiment of the disclosure further provides a computer storage medium. The computer storage medium stores a computer program executed by the audio data processing apparatus 1 mentioned above, and the computer program includes program instructions. When executing the program instructions, the processor can perform the description about the audio data processing method in the foregoing embodiment corresponding to FIG. 5 or FIG. 9 or FIG. 12 or FIG. 13 or another method embodiment. Therefore, details are not described herein again. In addition, the description of beneficial effects of the same method is not described herein again. For technical details that are not disclosed in the computer storage medium embodiments of the disclosure, refer to the descriptions of the method embodiments of the disclosure.

It can be understood that, an example embodiment of the disclosure further provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to perform the description about the audio data processing method in the foregoing embodiment corresponding to FIG. 5 or FIG. 9 or FIG. 12 or FIG. 13 or another method embodiment. Therefore, details are not described herein again. In addition, the description of beneficial effects of the same method is not described herein again. For technical details that are not disclosed in the computer storage medium embodiments of the disclosure, refer to the descriptions of the method embodiments of the disclosure.

Persons of ordinary skill in the art may understand that all or some of the procedures of the methods in an example embodiment may be implemented by using a computer program instructing relevant hardware. The program may be stored in a computer-readable storage medium. When the program runs, the procedures of the methods in an example embodiment are performed. The storage medium may be a magnetic disk, an optical disc, a read-only memory (Read-Only Memory, ROM), a random access memory (Random Access Memory, RAM), or the like.

What is disclosed above is merely exemplary embodiments of the disclosure, and certainly is not intended to limit the protection scope of the disclosure. Therefore, equivalent variations made in accordance with the claims of the disclosure shall fall within the scope of the disclosure.

What is claimed is:

1. An audio data processing method, performed by a computer device that implements an application layer for executing a plurality of service applications on the computer device, and a terminal system layer that is an underlying system layer of the computer device to which the plurality of service applications belong, the application layer implementing a first plurality of optimization components, and the terminal system layer implementing a second plurality of optimization components corresponding to the first plurality of optimization components, the computer device further implementing a plurality of service modes coexisting in parallel, for controlling states of the first plurality of optimization components and the second plurality of optimization components, based on a service application executing in one of the plurality of service modes, the audio data processing method comprising:

obtaining, based on a first service application executing, via the application layer in a first service mode that is a game voice mode, a signal processing result associated with a first pre-signal processing policy of the first service application that is implemented in the application layer, the first pre-signal processing policy comprising a first optimization component;

preventing a second optimization component implemented in the terminal system layer, that corresponds to the first optimization component from being in a turned-on state at a same time as the first optimization component, by controlling, from the application layer via the first service application, according to the signal processing result, at least one from among:
 a second state of the second optimization component in a second pre-signal processing policy of the terminal system layer, the second state indicating whether the second optimization component is turned on or turned off, and
 a first state of the first optimization component in the first pre-signal processing policy, the first state indicating whether the first optimization component is turned on or turned off, such that: at least one optimization component remains turned on in the first pre-signal processing policy and the second pre-signal processing policy, wherein a first remaining optimization component turned on in the first pre-signal processing policy does not correspond to a second remaining optimization component turned on in the second pre-signal processing policy; and obtaining uplink voice data of a first user corresponding to the first service application, and performing, based on the first remaining optimization component and the second remaining optimization component, voice optimization on the uplink voice data.

2. The audio data processing method according to claim 1, wherein the preventing the second optimization component from being in the turned-on state at the same time as the first optimization component comprises:

determining, based on the signal processing result, the second remaining optimization component, and a third optimization component turned off in the second pre-signal processing policy;

using, from the application layer, the third optimization component as a first collaboration component, and turning on, in the first pre-signal processing policy, a fourth optimization component having a corresponding optimization function to that of the first collaboration component; and using, from the application layer, the second remaining optimization component as a second collaboration component, and turning off, in the first pre-signal processing policy, a fifth optimization component having a corresponding optimization function to that of the second collaboration component.

3. The audio data processing method according to claim 1, wherein the first optimization component comprises at least one of: a first acoustic echo cancellation component, a first noise suppression component, and a first gain control component,
 wherein the second optimization component comprises at least one of: a second acoustic echo cancellation component, a second noise suppression component, and a second gain control component, and
 wherein the first acoustic echo cancellation component and the second acoustic echo cancellation component are both configured to perform acoustic echo cancellation, the first noise suppression component and the second noise suppression component are both configured to perform noise suppression, and the first gain control component and the second gain control component are both configured to perform gain adjustment.

4. The audio data processing method according to claim 1, wherein the obtaining, the signal processing result comprises:

configuring, in the first service mode, according to a sound quality index of the first service application, a sound quality parameter of the first service application;

obtaining a terminal type of a terminal to which the first service application belongs, and searching a test list associated with the first service application for a test type matching the terminal type;

obtaining, from the test list and based on the sound quality parameter, based on a test type matching the terminal type being found by searching the test list, a first test processing result obtained by using the first pre-signal processing policy and a second test processing result obtained by using the second pre-signal processing policy; and determining, based on the first test processing result and the second test processing result, an optimal signal processing policy associated with the sound quality parameter from the first pre-signal processing policy and the second pre-signal processing policy, and using the optimal signal processing policy as the signal processing result associated with the first pre-signal processing policy.

5. The audio data processing method according to claim 4, wherein the first optimization component in the first pre-signal processing policy comprises at least one of: a first acoustic echo cancellation algorithm used for performing acoustic echo cancellation in the application layer, a first noise suppression algorithm used for performing noise suppression in the application layer, and a first gain control algorithm used for performing gain adjustment in the application layer; and the second optimization component in the second pre-signal processing policy comprises at least one of: a second acoustic echo cancellation algorithm used for performing acoustic echo cancellation in the terminal system layer, a second noise suppression algorithm used for performing noise suppression in the terminal system layer, and a second gain control algorithm used for performing gain adjustment in the terminal system layer.

6. The audio data processing method according to claim 5, wherein the determining the optimal signal processing policy comprises:

obtaining a first acoustic echo cancellation result corresponding to the first acoustic echo cancellation algorithm from the first test processing result, obtaining a second acoustic echo cancellation result corresponding to the second acoustic echo cancellation algorithm from the second test processing result, selecting, based on the first acoustic echo cancellation result and the second acoustic echo cancellation result, an optimal acoustic echo cancellation algorithm from the first acoustic echo cancellation algorithm and the second acoustic echo cancellation algorithm, and using the optimal acoustic echo cancellation algorithm as a first optimal signal processing policy associated with the sound quality parameter;

obtaining a first noise suppression result corresponding to the first noise suppression algorithm from the first test processing result, obtaining a second noise suppression result corresponding to the second noise suppression algorithm from the second test processing result, selecting, based on the first noise suppression result and the second noise suppression result, an optimal noise suppression algorithm from the first noise suppression algorithm and the second noise suppression algorithm, and using the optimal noise suppression algorithm as a second optimal signal processing policy associated with the sound quality parameter;

obtaining a first gain control result corresponding to the first gain control algorithm from the first test processing result, obtaining a second gain control result corresponding to the second gain control algorithm from the second test processing result, selecting, based on the first gain control result and the second gain control result, an optimal gain control algorithm from the first gain control algorithm and the second gain control algorithm, and using the optimal gain control algorithm as a third optimal signal processing policy associated with the sound quality parameter; and determining the first optimal signal processing policy, the second optimal signal processing policy, and the third optimal signal processing policy as the signal processing result associated with the first pre-signal processing policy.

7. The audio data processing method according to claim 6, further comprising:

obtaining the first acoustic echo cancellation result corresponding to the first acoustic echo cancellation algorithm from the first test processing result, and obtaining the second acoustic echo cancellation result corresponding to the second acoustic echo cancellation algorithm from the second test processing result;

comparing optimization quality corresponding to the first acoustic echo cancellation result with optimization quality corresponding to the second acoustic echo cancellation result, to obtain a first comparison result;

using, based on the first comparison result indicating that the optimization quality corresponding to the first acoustic echo cancellation result is better than the optimization quality corresponding to the second acoustic echo cancellation result, the first acoustic echo cancellation algorithm in the first pre-signal processing policy as the first optimal signal processing policy associated with the sound quality parameter; and using, based on the first comparison result indicating that the optimization quality corresponding to the second acoustic echo cancellation result is better than the optimization quality corresponding to the first acoustic echo cancellation result, the second acoustic echo cancellation algorithm in the second pre-signal processing policy as the first optimal signal processing policy associated with the sound quality parameter.

8. The audio data processing method according to claim 6, further comprising:

obtaining the first noise suppression result corresponding to the first noise suppression algorithm from the first test processing result, and obtaining the second noise suppression result corresponding to the second noise suppression algorithm from the second test processing result;

comparing optimization quality corresponding to the first noise suppression result with optimization quality corresponding to the second noise suppression result, to obtain a second comparison result;

using, based on the second comparison result indicating that the optimization quality corresponding to the first noise suppression result is better than the optimization quality corresponding to the second noise suppression result, the first noise suppression algorithm in the first pre-signal processing policy as the second optimal signal processing policy associated with the sound quality parameter; and using, based on the second comparison result indicating that the optimization quality corresponding to the second noise suppression result is better than the optimization quality corresponding to the first noise suppression result, the second noise suppression algorithm in the second pre-signal processing policy as the second optimal signal processing policy associated with the sound quality parameter.

9. The audio data processing method according to claim 6, further comprising:

obtaining the first gain control result corresponding to the first gain control algorithm from the first test processing result, and obtaining the second gain control result corresponding to the second gain control algorithm from the second test processing result;

comparing optimization quality corresponding to the first gain control result with optimization quality corresponding to the second gain control result, to obtain a third comparison result;

using, based on the third comparison result indicating that the optimization quality corresponding to the first gain control result is better than the optimization quality corresponding to the second gain control result, the first gain control algorithm in the first pre-signal processing policy as the third optimal signal processing policy associated with the sound quality parameter; and using, based on the third comparison result indicating that the optimization quality corresponding to the second gain control result is better than the optimization quality corresponding to the first gain control result, the second gain control algorithm in the second pre-signal processing policy as the third optimal signal processing policy associated with the sound quality parameter.

10. The audio data processing method according to claim 4, further comprising:

based on no test type matching the terminal type being found by searching the test list, performing, based on the uplink voice data of the first user being obtained through a microphone in the first service mode, voice optimization on the uplink voice data through the first pre-signal processing policy, to obtain a first voice optimization result, and voice optimization on the uplink voice data through the second pre-signal processing policy, to obtain a second voice optimization result; and determining, based on the first voice optimization result and the second voice optimization result, the optimal signal processing policy from the first pre-signal processing policy and the second pre-signal processing policy, and using the optimal signal processing policy as the signal processing result associated with the first pre-signal processing policy.

11. The audio data processing method according to claim 1, further comprising, prior to the first service application executing in the first service mode:
   obtaining, based on the first user accessing the first service application, a system resource package used for loading the first service application, and parsing the system resource package, to obtain system resource data of the first service application; and
   initializing the system resource data, and initially configuring, based on the initialized system resource data, a service mode of the first service application as a second service mode that is a system media mode.

12. The audio data processing method according to claim 11, further comprising, after the initially configuring the second service mode of the first service application, and prior to the first service application executing in the first service mode:
   outputting, based on the initialized system resource data, an application display interface of the first service application, wherein the application display interface comprises a voice control used for indicating that the first user initiates a voice interaction service;
   detecting an application type of the first service application in response to a voice turn-on operation of the first user for the voice control; and
   switching, based on detecting that the application type of the first service application is a game type, the service mode of the first service application from the second service mode to the first service mode.

13. The audio data processing method according to claim 12, further comprising, after the outputting the application display interface of the first service application:
   switching, based on detecting that the application type of the first service application is a non-game type, the service mode of the first service application from the second service mode to a third service mode that is a system call mode;
   transmitting, base on a call type of the voice interaction service being a system call type, a system call request corresponding to the system call type to a second user through the first service application, wherein the second user is a user selected by the first user in the first service application; and
   establishing, based on the second user responding to the system call request, a system communication channel between the first user and the second user, and making a system call based on the system communication channel.

14. The audio data processing method according to claim 12, further comprising:
   switching, in response to a voice turn-off operation of the first user for the voice control, the service mode of the first service application from the first service mode back to the second service mode.

15. The audio data processing method according to claim 1, further comprising:
   using voice-optimized uplink voice data as a target voice optimization result corresponding to the uplink voice data; and
   transmitting the target voice optimization result to a terminal corresponding to a third user associated with the first user, to cause the terminal corresponding to the third user to play the voice-optimized uplink voice data through a speaker in the first service mode.

16. An audio data processing apparatus that implements an application layer for executing a plurality of service applications, and a terminal system layer that is an underlying system layer to which the plurality of service applications belong, the application layer implementing a first plurality of optimization components, and the terminal system layer implementing a second plurality of optimization components corresponding to the first plurality of optimization components, the audio data processing apparatus further implementing a plurality of service modes coexisting in parallel, for controlling states of the first plurality of optimization components and the second plurality of optimization components, based on a service application executing in one of the plurality of service modes, the audio data processing apparatus comprising:
   at least one memory configured to store program code; and
   at least one processor configured to read the program code and operate as instructed by the program code, the program code comprising:
   processing result obtaining code configured to cause at least one of the at least one processor to obtain, based on a first service application executing, via the application layer in a first service mode that is a game voice mode, a signal processing result associated with a first pre-signal processing policy of the first service application that is implemented in the application layer, the first pre-signal processing policy comprising a first optimization component;
   component control code configured to cause at least one of the at least one processor to prevent a second optimization component implemented in the terminal system layer, that corresponds to the first optimization component, from being in a turned-on state at a same time as the first optimization component, by controlling, from the application layer via the first service application, according to the signal processing result, at least one from among:
      a second state of the second optimization component in a second pre-signal processing policy of the terminal system layer, the second state indicating whether the second optimization component is turned on or turned off, and
      a first state of the first optimization component in the first pre-signal processing policy, the first state indicating whether the first optimization ponent is turned on or turned off,
      such that: at least one optimization component remains turned on in the first pre-signal processing policy and the second pre-signal processing policy, wherein a first remaining optimization component turned on in the first pre-signal processing policy does not correspond to a second remaining optimization component turned on in the second pre-signal processing policy; and
   voice optimization code configured to cause at least one of the at least one processor to obtain uplink voice data of a first user corresponding to the first service application, and perform, based on the first remaining optimization component and the second remaining optimization component, voice optimization on the uplink voice data.

17. The audio data processing apparatus according to claim 16, wherein the component control code is configured to cause the at least one processor to:

determine, based on the signal processing result, the second remaining optimization component, and a third optimization component turned off in the second pre-signal processing policy;

use, from the application layer, the third optimization component as a first collaboration component, and turning on, in the first pre-signal processing policy, a fourth optimization component having a corresponding optimization function to that of the first collaboration component; and use, from the application layer, the second remaining optimization component as a second collaboration component, and turning off, in the first pre-signal processing policy, a fifth optimization component having a corresponding optimization function as that of the second collaboration component.

18. The audio data processing apparatus according to claim 16, wherein the first optimization component comprises at least one of: a first acoustic echo cancellation component, a first noise suppression component, and a first gain control component, wherein the second optimization component comprises at least one of: a second acoustic echo cancellation component, a second noise suppression component, and a second gain control component, and wherein the first acoustic echo cancellation component and the second acoustic echo cancellation component are both configured to perform acoustic echo cancellation, the first noise suppression component and the second noise suppression component are both configured to perform noise suppression, and the first gain control component and the second gain control component are both configured to perform gain adjustment.

19. The audio data processing apparatus according to claim 16, wherein the processing result obtaining code is configured to cause at least one of the at least one processor to:

configure, in the first service mode, according to a sound quality index of the first service application, a sound quality parameter of the first service application;

obtain a terminal type of a terminal to which the first service application belongs, and searching a test list associated with the first service application for a test type matching the terminal type;

obtain, from the test list and based on the sound quality parameter based on a test type matching the terminal type being found by searching the test list, a first test processing result obtained by using the first pre-signal processing policy and a second test processing result obtained by using the second pre-signal processing policy; and determine, based on the first test processing result and the second test processing result, an optimal signal processing policy associated with the sound quality parameter from the first pre-signal processing policy and the second pre-signal processing policy, and using the optimal signal processing policy as the signal processing result associated with the first pre-signal processing policy.

20. A non-transitory computer-readable storage medium, storing a computer program for a computer device that implements an application layer for executing a plurality of service applications on the computer device, and a terminal system layer that is an underlying system layer of the computer device to which the plurality of service applications belong, the application layer implementing a first plurality of optimization components, and the terminal system layer implementing a second plurality of optimization components corresponding to the first plurality of optimization components, the computer device further implementing a plurality of service modes coexisting in parallel, for controlling states of the first plurality of optimization components and the second plurality of optimization components, based on a service application executing in one of the plurality of service modes, wherein the computer program, when executed by at least one processor, causes the at least one processor to:

obtain, based on a first service application executing via the application layer in a first service mode that is a game voice mode, a signal processing result associated with a first pre-signal processing policy of the first service application that is implemented in the application layer, the first pre-signal processing policy comprising a first optimization component;

prevent a second optimization component implemented in the terminal system layer, that corresponds to the first optimization component, from being in a turned-on state at a same time as the first optimization component, by controlling, from the application layer via the first service application, according to the signal processing result, at least one from among:

a second state of the second optimization component in a second pre-signal processing policy of the terminal system layer the second state indicating whether the second optimization component is turned on or turned off, and a first state of the first optimization component in the first pre-signal processing policy, the first state indicating whether the first optimization component is turned on or turned off, such that: at least one optimization component remains turned on in the first pre-signal processing policy and the second pre-signal processing policy, wherein a first remaining optimization component turned on in the first pre-signal processing policy does not correspond to a second remaining optimization component turned on in the second pre-signal processing policy; and obtain uplink voice data of a first user corresponding to the first service application, and performing, based on the first remaining optimization component and the second remaining optimization component, voice optimization on the uplink voice data.

* * * * *